US009845189B2

(12) United States Patent
Potter et al.

(10) Patent No.: US 9,845,189 B2
(45) Date of Patent: Dec. 19, 2017

(54) METHODS AND SYSTEMS FOR MASS DISTRIBUTION OF SUPPLY PACKS

(71) Applicant: Skylife Technology Holdings, LLC, Toledo, OH (US)

(72) Inventors: Jeffrey J. Potter, Toledo, OH (US); Matthew J. Medlin, Sylvania, OH (US); Greg J. Konczal, Holland, OH (US); Rory T. McDonnell, Toledo, OH (US)

(73) Assignee: The SkyLife Company, Inc., Rossford, OH (US)

( * ) Notice: Subject to any disclaimer, the term of this patent is extended or adjusted under 35 U.S.C. 154(b) by 675 days.

(21) Appl. No.: 14/267,766

(22) Filed: May 1, 2014

(65) Prior Publication Data
US 2014/0263840 A1    Sep. 18, 2014

Related U.S. Application Data

(63) Continuation-in-part of application No. 13/833,938, filed on Mar. 15, 2013, now Pat. No. 9,457,902, which is a continuation-in-part of application No. 13/215,063, filed on Aug. 22, 2011, now Pat. No. 8,794,573.

(60) Provisional application No. 61/818,136, filed on May 1, 2013, provisional application No. 61/611,831, filed on Mar. 16, 2012, provisional application No.
(Continued)

(51) Int. Cl.
B65D 88/02    (2006.01)
B64D 1/08    (2006.01)
B64D 1/12    (2006.01)
B64D 1/14    (2006.01)

(52) U.S. Cl.
CPC ............ *B65D 88/027* (2013.01); *B64D 1/08* (2013.01); *B64D 1/12* (2013.01); *B64D 1/14* (2013.01)

(58) Field of Classification Search
CPC . B64D 1/08; B64D 1/12; B64D 17/00; B65D 77/02
See application file for complete search history.

(56) References Cited

U.S. PATENT DOCUMENTS 2,495,486 A    1/1950    Stevenson
2,687,263 A    8/1954    Frieder et al.
(Continued)

FOREIGN PATENT DOCUMENTS

CA    2377291    9/2003
DE    19940743    4/2000
(Continued)

OTHER PUBLICATIONS

CN Office Action for PCT/US2011/048666, dated Jun. 25, 2014.
(Continued)

*Primary Examiner* — Valentina Xavier
(74) *Attorney, Agent, or Firm* — Remenick PLLC

(57) ABSTRACT

An aerial distribution system and method for deploying items is disclosed. The system includes a bulk shipping container comprised of a single piece of corrugated plastic, cut and folded into a closable box, a plurality of deployment boxes within the bulk shipping container, each deployment box containing at least one item, a plurality of tethers, each tether coupling a deployment box to the bulk shipping container, and a freefall retarding device coupled to the bulk shipping container.

9 Claims, 30 Drawing Sheets

Related U.S. Application Data

61/680,928, filed on Aug. 8, 2012, provisional application No. 61/746,383, filed on Dec. 27, 2012, provisional application No. 61/375,423, filed on Aug. 20, 2010.

(56) References Cited

U.S. PATENT DOCUMENTS

| | | | |
|---|---|---|---|
| 2,790,284 A * | 4/1957 | Hultkrans | B65B 31/024 |
| | | | 53/405 |
| 3,050,278 A | 8/1961 | Furrer | |
| 3,115,831 A | 12/1963 | Suter | |
| 3,168,267 A * | 2/1965 | Ferris | B64D 1/02 |
| | | | 244/138 A |
| 3,279,594 A * | 10/1966 | Worthington, III | B65D 85/546 |
| | | | 206/312 |
| 3,401,905 A * | 9/1968 | Rohrlick | B64D 1/02 |
| | | | 244/137.3 |
| 3,446,458 A | 5/1969 | Rogallo | |
| 3,491,632 A | 1/1970 | Dovey et al. | |
| 3,724,788 A * | 4/1973 | Petry | B64D 1/12 |
| | | | 244/137.3 |
| 3,818,129 A | 6/1974 | Yamamoto | |
| 3,869,842 A | 3/1975 | Verbeke | |
| 3,880,343 A * | 4/1975 | Rockefeller | B65D 5/4804 |
| | | | 229/120.02 |
| 3,904,105 A * | 9/1975 | Booth | B65D 5/12 |
| | | | 206/386 |
| 4,121,755 A | 10/1978 | Meseke et al. | |
| 4,194,652 A * | 3/1980 | Williamson | B65D 88/1612 |
| | | | 112/418 |
| 4,241,890 A | 12/1980 | Pearson | |
| 4,349,168 A | 9/1982 | Barnes | |
| 4,374,578 A | 2/1983 | Banks | |
| 4,624,407 A * | 11/1986 | Janhonen | B65D 75/38 |
| | | | 229/800 |
| 4,807,299 A * | 2/1989 | Nattrass | B65D 88/1681 |
| | | | 383/109 |
| 4,832,256 A * | 5/1989 | Grigsby | B65D 5/446 |
| | | | 217/36 |
| 5,149,019 A * | 9/1992 | Stenlund | B64D 17/78 |
| | | | 244/145 |
| 5,269,119 A | 12/1993 | Tolson | |
| 5,284,454 A * | 2/1994 | Randolph | A63H 27/12 |
| | | | 446/36 |
| 5,295,580 A | 3/1994 | Hicks | |
| 5,531,165 A * | 7/1996 | Taravella | B65D 19/0012 |
| | | | 108/51.3 |
| 5,704,487 A * | 1/1998 | Taravella | B65D 19/20 |
| | | | 108/51.3 |
| 5,771,667 A | 6/1998 | McGregor et al. | |
| 5,779,052 A | 7/1998 | Woodford et al. | |
| 5,947,419 A * | 9/1999 | Warren | B64D 1/02 |
| | | | 102/384 |
| 6,003,706 A | 12/1999 | Rosen | |
| 6,098,798 A | 8/2000 | Abbott | |
| 6,231,284 B1 | 5/2001 | Kordel | |
| 6,595,344 B1 | 7/2003 | Davis et al. | |
| 6,712,317 B1 | 3/2004 | Warren et al. | |
| 6,789,766 B2 * | 9/2004 | Horst | B64D 1/08 |
| | | | 244/137.3 |
| 6,817,578 B1 | 11/2004 | Garcia et al. | |
| D500,523 S * | 1/2005 | Amortegui R. | D20/21 |
| 7,090,029 B2 * | 8/2006 | Cleary | A62C 3/025 |
| | | | 169/36 |
| 8,979,030 B2 | 3/2015 | Potter et al. | |
| 9,296,470 B1 | 3/2016 | Moselage, III | |
| 2003/0197095 A1 * | 10/2003 | Preston | B64D 1/14 |
| | | | 244/152 |
| 2004/0051006 A1 | 3/2004 | Warren et al. | |
| 2005/0029335 A1 | 2/2005 | Abernathy | |
| 2006/0025293 A1 * | 2/2006 | Moen | B31F 1/2854 |
| | | | 493/84 |
| 2007/0090174 A1 * | 4/2007 | Goddard | A62C 3/0235 |
| | | | 229/100 |
| 2007/0164023 A1 | 7/2007 | Lapoint | |
| 2007/0193479 A1 * | 8/2007 | Slaats | A47F 5/0018 |
| | | | 108/53.1 |
| 2008/0219830 A1 | 9/2008 | Wells | |
| 2009/0127397 A1 * | 5/2009 | Hyunh | B64D 17/383 |
| | | | 244/152 |
| 2009/0272852 A1 * | 11/2009 | Reynolds | B64D 1/08 |
| | | | 244/138 A |
| 2011/0133036 A1 | 6/2011 | Goddard et al. | |
| 2012/0043426 A1 | 2/2012 | Potter et al. | |
| 2012/0325693 A1 | 12/2012 | Mooney et al. | |
| 2013/0292142 A1 * | 11/2013 | Goddard | A62C 31/00 |
| | | | 169/46 |
| 2013/0334371 A1 | 12/2013 | Potter et al. | |
| 2014/0076760 A1 * | 3/2014 | Christiansen | B65D 5/5047 |
| | | | 206/386 |
| 2015/0291298 A1 | 10/2015 | Potter et al. | |

FOREIGN PATENT DOCUMENTS

| | | |
|---|---|---|
| EP | GB776950 | 6/1957 |
| EP | GB00829401 | 3/1960 |
| JP | 309981 | 12/1990 |
| JP | 162295 | 7/1996 |
| JP | 134004 | 6/2013 |
| WO | WO03016135 | 2/2003 |

OTHER PUBLICATIONS

PCT Patentability Report for PCT/US14/036430, dated Sep. 4, 2014.
PCT Patentability Report for PCT/US2013/031991, dated Sep. 16, 2014.
PCT Search Report for PCT/US2013/031991, dated Jun. 25, 2013.
PCT Search Report for PCT/US11/48666 dated Jan. 31, 2012.
PCT Patentability Report for PCT/US11/48666 dated Jan. 31, 2012.
JP Office Action for PCT/US2011/048666, dated Jul. 10, 2014.
KR Office Action for PCT/US2013/031991, dated Dec. 10, 2015.
JP Office Action for PCT/US2013/031991, dated Nov. 17, 2015.

* cited by examiner

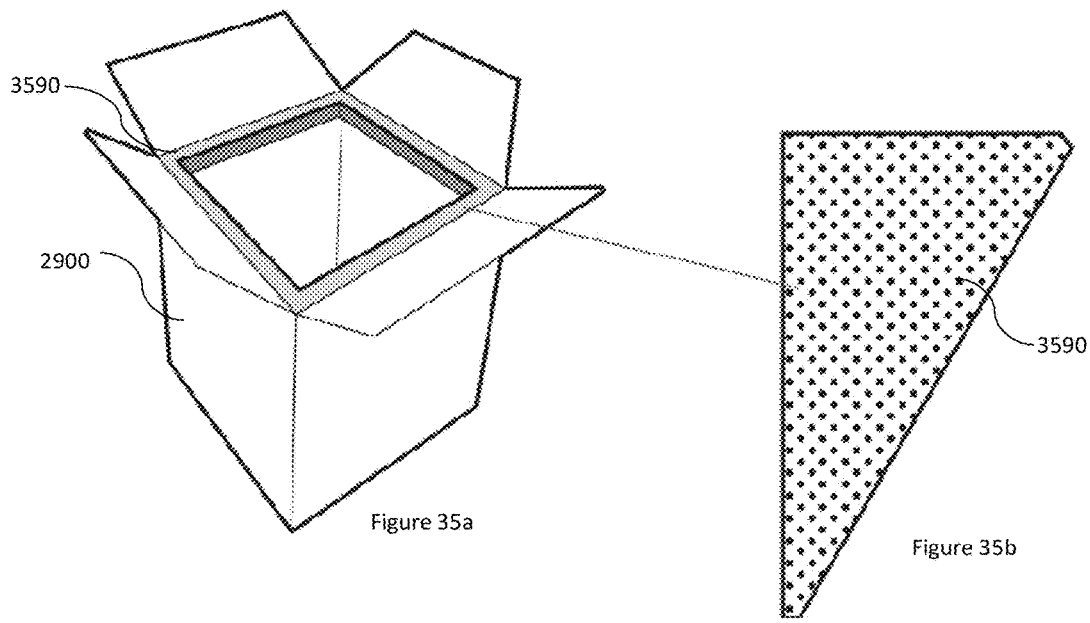
Figure 35a
Figure 35b
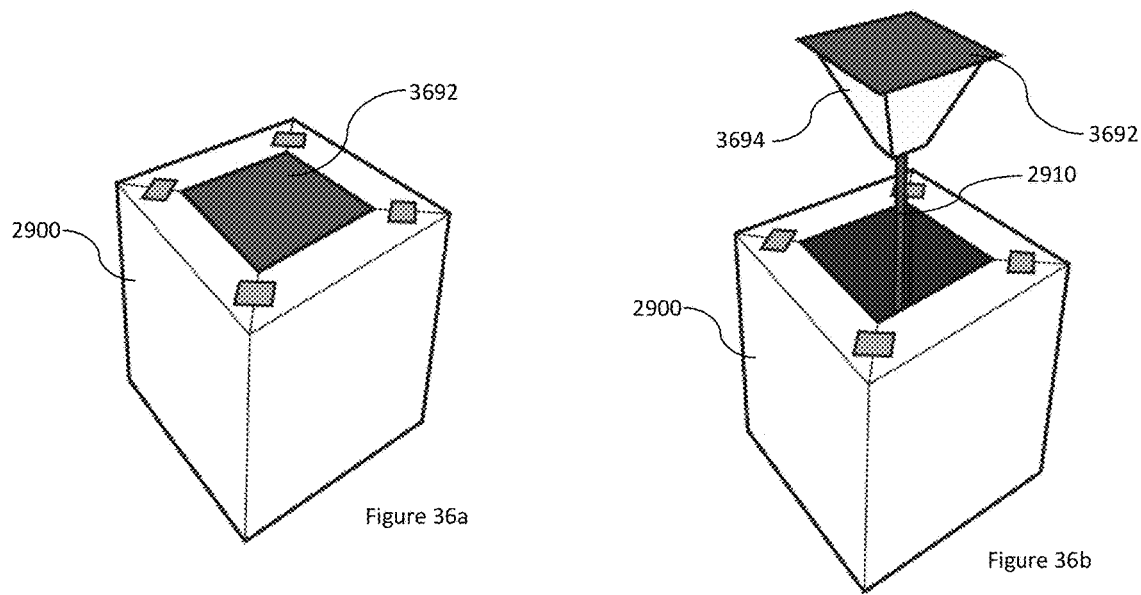
Figure 36a
Figure 36b

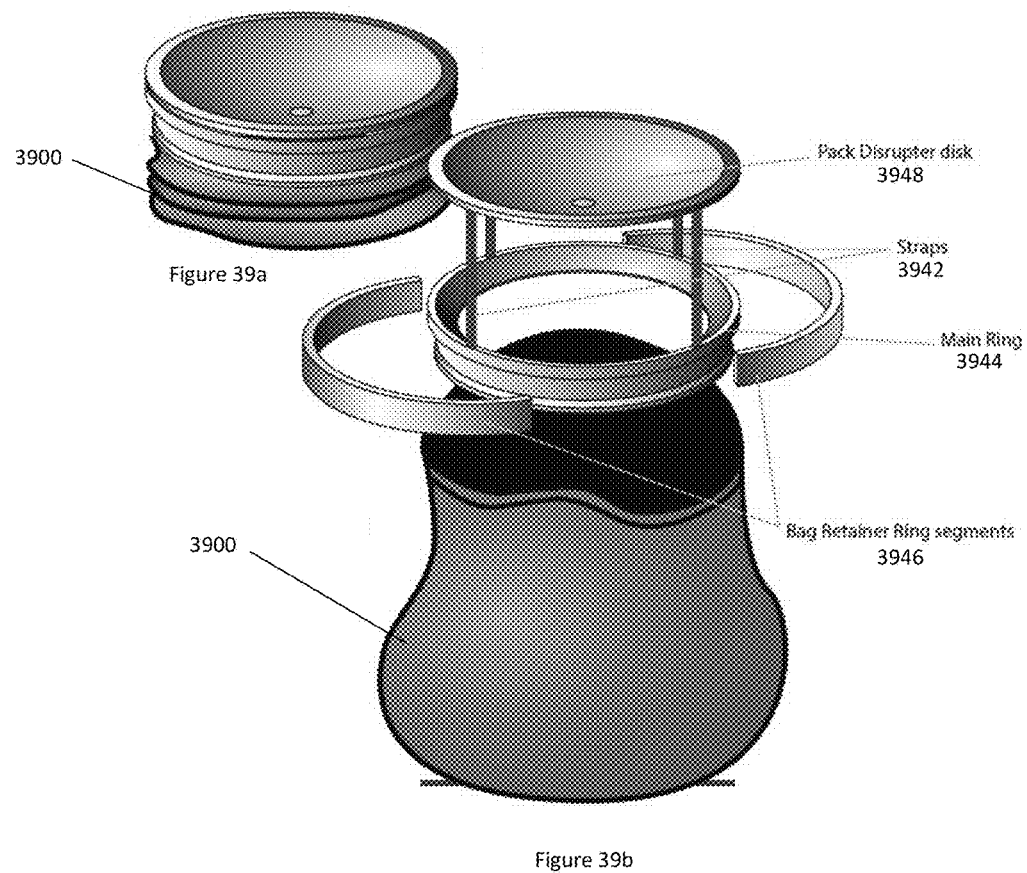
Figure 39a
Figure 39b
Figure 39c

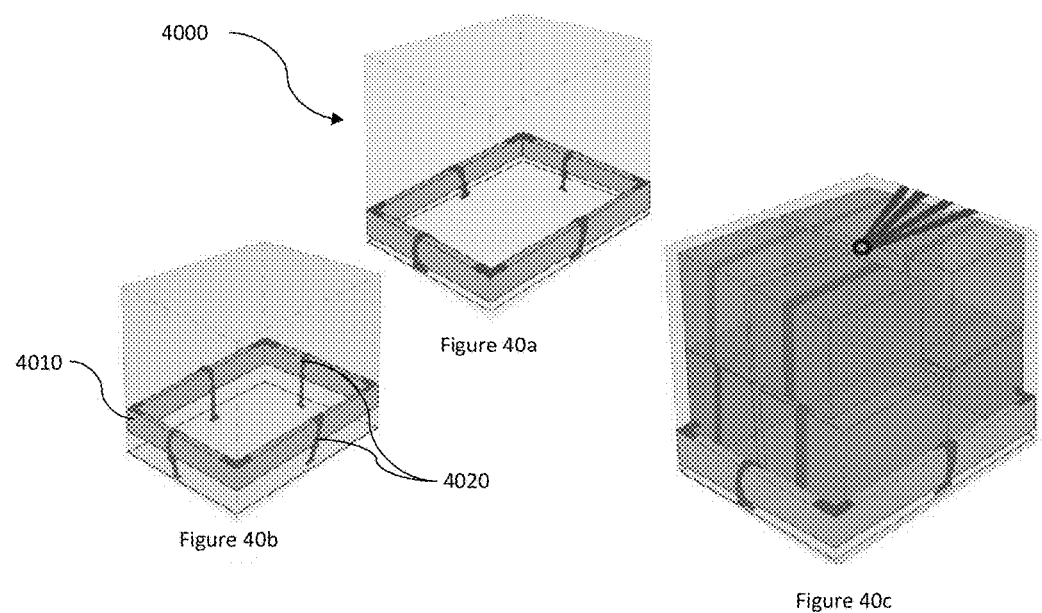
Figure 40a
Figure 40b
Figure 40c
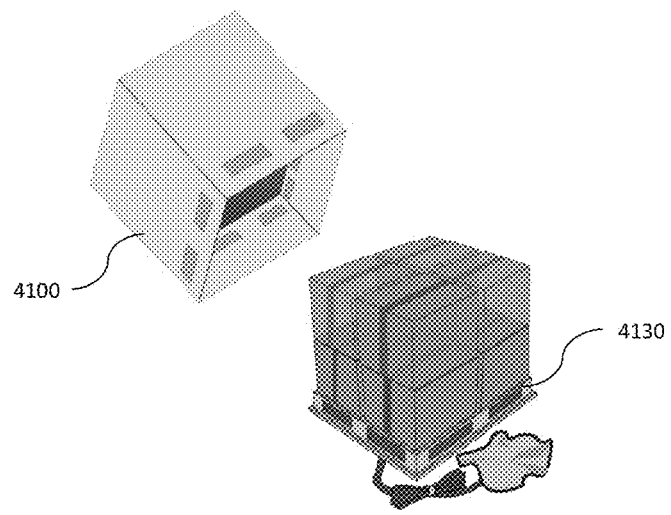
Figure 41

METHODS AND SYSTEMS FOR MASS DISTRIBUTION OF SUPPLY PACKS

REFERENCE TO RELATED APPLICATIONS

This application claims priority to U.S. Provisional Application No. 61/818,136 entitled "Supply Packs and Methods and Systems for the Manufacture of Supply Packs" filed May 1, 2013; a continuation-in-part of U.S. application Ser. No. 13/833,938, filed Mar. 15, 2013, which claims priority to U.S. Provisional Application Nos. 61/611,831 filed Mar. 16, 2012, 61/680,928 filed Aug. 8, 2012, and 61/746,383, filed Dec. 27, 2012, each entitled, "Emergency Supply Pack and a Method and System of Making and Distributing the Emergency Supply Pack;" and a continuation-in-part of U.S. application Ser. No. 13/215,063 filed Aug. 22, 2011, which claims priority to U.S. Provisional Application No. 61/375,423 filed Aug. 20, 2010, entitled, "Emergency Supply Pack and a Method and System of Making and Distributing the Emergency Supply Pack." The entirety of each of these applications is specifically incorporated by reference herein.

BACKGROUND

1. Field of the Invention

The present invention relates to packs and methods and systems for manufacturing the packs. More particularly, the invention is directed to cost-effective packs adapted to be distributed from an aircraft and methods and systems for manufacturing the packs.

2. Description of the Background

Numerous circumstances require the transport and delivery of various kinds of cargo to inaccessible or remote areas where ground transportation is not possible or timely. For example, in the event that people are trapped or disabled in a remote area, a hostile environment, or an area ravaged by a natural disaster, it may become necessary or desirable to supply them with food, water, medicine, shelter, and other supplies as rapidly as possible. Similarly, in times of warfare, battlefields may be in remote locations or hostile environments. Likewise, it may be necessary to deliver supplies such as fuel to stranded people. Of course, in times of war or other hostilities, it may be essential to provide support to permit the stranded personnel to evacuate the position in which they find themselves.

Many remote locations or hostile environments may be in areas such as deserts or large expanses of otherwise uninhabited or inhospitable terrain. Because of the remoteness of a location or its inaccessibility, supplies are often delivered by air drops from airplanes or helicopters. In the event of natural disasters and other emergencies, time may be of the essence to deliver sustenance, medicine, or other critical items to people cut off from life-sustaining supplies. For example, it might be essential to provide water to people cut off from a clean water supply in the event of flooding, an earthquake, and/or a hurricane.

While in an emergency, the cost of packaging and delivering supplies to those in need may be considered secondary, it is nevertheless important to provide packaging for the supplies that can be formed and distributed on a reasonably cost-effective basis. Also, the space taken up by the containers or packages, as well as the amount and cost of material from which the containers are fabricated, should be minimized to increase the cost effectiveness thereof.

In the past, relief supplies have been delivered by dropping pallets of supplies by parachutes connected to containers. Typically, large amounts of supplies are stacked on multiple pallets and parachutes are connected to the pallets. However, parachutes are expensive and are typically not recoverable. Moreover, the parachutes may be quite large and cumbersome. The size of the parachutes depends on the particular supplies to be distributed. If the parachutes are undersized, the containers descend at a rapid rate and the container may be ruptured and the contents thereof lost, or people on the ground may be harmed by the rapidly-descending containers. Furthermore, if the supplies are stacked together on a pallet and the pallet air drop is off target, the supplies may be unrecoverable by those in need. Even if the pallet of supplies is recoverable, bandits or guerillas have been known to hoard the supplies and either keep them from people in need or ransom the supplies.

There is a continuing need for a cost-effective package for emergency supplies that may be easily air dropped and distributed to a large number of people with a minimized risk of damage to the supplies and harm to the people collecting the supplies. Additionally, there is a continuing need for a method and system for manufacturing the packages.

SUMMARY OF THE INVENTION

In concordance with the instant disclosure, a cost-effective pack for supplies that may be easily air dropped and distributed to a large number of people with a minimized risk of damage to the supplies and harm to the people collecting the supplies has surprisingly been discovered. Additionally, a method and system for manufacturing the cost-effective packs has surprisingly been discovered.

One embodiment of the invention is directed to a pack for aerial distribution of one or more items to persons on the ground. The pack comprises an outer package, at least one item disposed in the outer package, at least one ridged element coupled to the outer package, and at least one aerodynamic component extending from the outer package, wherein the aerodynamic element reduces descent rate of the pack in comparison to freefall.

In a preferred embodiment, the outer package is comprised of a pair of superposed sheets having opposing faces that are joined together. Preferably, the superposed sheets are comprised of a plurality of layers. In a preferred embodiment, at least one inner package is confined within the outer package. The at least one inner package preferably allows the at least one item to move freely or in a specified range within the inner package. In a preferred embodiment, the at least one item is fixed within the inner package. Preferably, the at least one inner package is coupled to the outer package. The pack of claim 1, wherein the at least one aerodynamic component extends from an edge of the outer package.

In a preferred embodiment, the outer package and the aerodynamic component are manufactured of the same material and as a single unit. Preferably the at least one aerodynamic component includes a pair of wings configured to unfurl during an aerial delivery of the pack. The pair of wings is preferably formed by folding corresponding side edges of the sheets and sealing the folded edges to form wing seals. The at least one aerodynamic component is preferably one or more of a tail, a fin, an airfoil, a parasail, a parachute, rotary blades, streamers, a tail, tunnels, dimples, vent slits, scalloped edges, or serrated edges.

In a preferred embodiment, the at least one rigid insert is disposed within the outer package. Preferably, the at least one rigid insert includes instructions related to the item for aerial delivery. Preferably, the pack contains no moving parts or electronics.

Preferably, the outer package includes a perforation to facilitate opening of the outer package. The perforation preferably extends inwardly from an edge of the pack and permits access to the item.

The at least one item is preferably chosen from the group consisting of one or more of mosquito netting, a tent, a blanket, one or more tools, one or more communication, navigation, heating, location or illumination devices, one or more batteries, a shelter, clothing, foot protection, rain gear, one or more hygienic supplies, one or more first aid supplies, ammunition or weapons, one or more parts for vehicles or equipment, one or more water purification supplies, one or more filters to remove contaminants from water, and video or paper information. In a preferred embodiment, the at least one item is a chosen from the group consisting of food, water, a medication, a fire-starting kit, and a fuel.

The pack preferably contains at least one alerting device. The at least one alerting device is preferably chosen from the group consisting of a whistle, a buzzer, a beeper, a light, and a glowing film. The pack also preferably contains a tracking device.

In a preferred embodiment, there are perforations within the outer package that create a handle when separated. Preferably, the outer package is vacuum sealed. In a preferred embodiment, the ridged element is one or more of cardboard, paper, plastic, ribs, metal, embossed surfaces, vacuum sealed portions, pressurized chambers and chambers filled with gas. Preferably, at least a portion of the outer package is filled with one or more of helium and hydrogen.

Another embodiment of the invention is directed to a method for manufacturing a pack. The method comprising the steps of providing a first sheet, depositing at least one item for aerial delivery to persons on the first sheet, disposing a second sheet over the at least one item and the first sheet, sealing the first sheet and the second sheet to form an outer package housing the at least one item, and forming at least one aerodynamic element on the outer package, wherein the aerodynamic element causes turbulent air flow across the outer package and reduces freefall descent rate of the pack in operation.

Preferably, the step of sealing the first sheet and the second sheet includes forming a top edge seal, a bottom edge seal, and spaced apart side edge seals. In a preferred embodiment, the step of sealing the first sheet and the second sheet includes forming a pair of mid-pack seals, the at least one item confined within the outer package by the pair of mid-pack seals, the top edge seal, and the bottom edge seal. The step of forming the at least one aerodynamic component preferably includes folding corresponding side edges of the first sheet and the second sheet to form folded edges. Preferably, the folded edges are sealed to form one or more wing seals. The one or more wing seals are preferably formed between one of the side edge seals and one of the mid-pack seals.

The method preferably includes a step of coupling an inner package to the outer package, the inner package containing the at least one item. Preferably, a top edge and a bottom edge of the inner package is sealed between the first sheet and the second sheet with a top transverse seal and a bottom transverse seal to couple the inner package to the outer package. In a preferred embodiment, the method also includes creating perforations within the first layer that facilitate opening of the pack. The perforations preferably extend inwardly from an edge of the pack and permits access to the inner package.

Preferably, the at least one item is selected from the group consisting of a mosquito netting, tent or shelter, a blanket, one or more tools, illumination, communication, heating or navigation devices, one or more batteries, rain gear, clothing, foot protection, hygienic supplies, ammunition or weapons, one or more parts for a vehicle or equipment, one or more first aid supplies, one or more water purification supplies, a filter, and video or paper informational instructions. In a preferred embodiment, the at least one is selected from the group consisting of food, water, medication, combustion materials, and fuel.

Another embodiment of the invention is directed to a system for manufacturing a pack. The system comprises a product loading unit for depositing at least one item for aerial delivery between a first sheet and a second sheet, a longitudinal mid-pack and edge sealing unit, a transverse heat sealing unit, the longitudinal mid-pack and edge sealing unit and the transverse heat sealing unit configured to seal the first sheet and the second sheet to form an outer package housing the at least one item, a wing folding unit, and a wing band sealing unit. The wing folding unit and the wing band sealing unit are configured to form one or more wings on the outer package. The one or more wings reduce the freefall descent rate of the pack during operation.

Preferably there is a perforator unit disposed between the transverse heat sealing unit and the wing folding unit. The perforator unit preferably forms a perforation to facilitate an opening of the pack. In a preferred embodiment, the perforator unit includes a perforation roll with a perforation blade disposed opposite an anvil roller.

In a preferred embodiment, the system also includes a guillotine package separator unit disposed adjacent the wing band sealing unit. The guillotine package separator unit preferably cuts along at least a portion of the perforation to form individual ones of the pack. Preferably there is at least one vacuum plenum for securing the first sheet to a conveyor for movement through the system.

Another embodiment of the invention is directed to a pack for distribution by an aircraft to persons on the ground. The pack comprises an outer package, at least one item disposed in the outer package, and at least one aerodynamic element attached to and extending from the outer package. The aerodynamic element has no moving parts and reduces freefall impact force of the pack so that the at least one item disposed in the outer package is not damaged upon contact with the ground and the pack poses a minimal risk of harm to the persons on the ground.

Another embodiment of the invention is directed to a pack for aerial distribution of one or more items to persons on the ground. The pack comprises an outer package, at least one item disposed in the outer package, and a pair of wings extending from the outer package configured to unfurl during an aerial delivery of the pack. The pair of wings reduce the descent rate of the pack in comparison to freefall.

Other embodiments and advantages of the invention are set forth in part in the description, which follows, and in part, may be obvious from this description, or may be learned from the practice of the invention.

DESCRIPTION OF THE DRAWINGS

FIGS. 35a-b depict an embodiment of a deflection device.

FIGS. 36a-b depict an embodiment of a disbursement device.

FIGS. 39a-c depict an embodiment of a storage and deployment bag.

FIGS. 40a-c depict an embodiment of a gaylord box.

FIG. 41 depicts another embodiment of a gaylord box.

DESCRIPTION OF THE INVENTION

Figure 1:
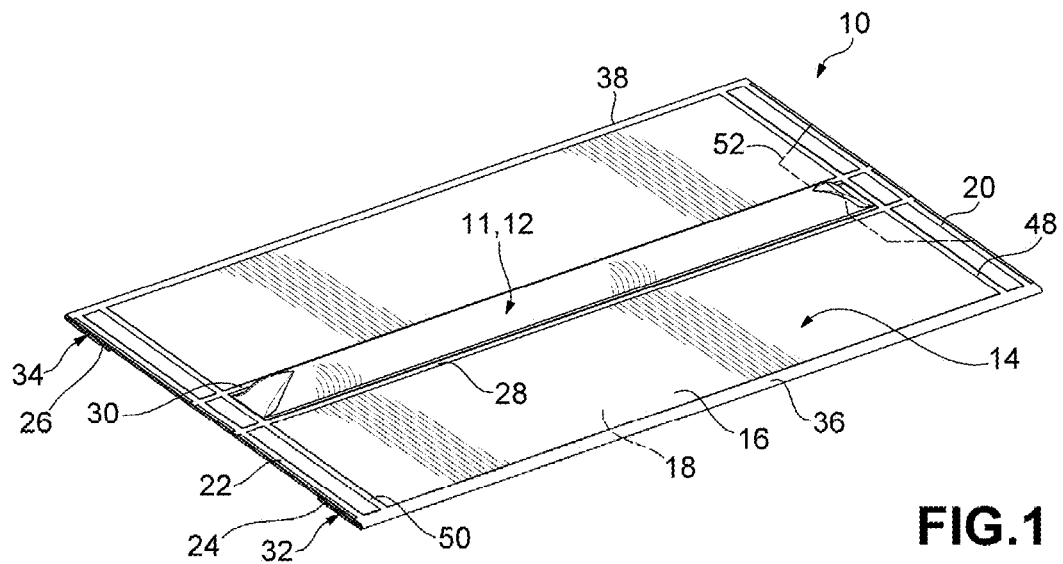
FIG. 1 is a top perspective view of an emergency pack according to one embodiment of the disclosure, the emergency pack shown in a formed position.

Providing supplies to a population under emergency conditions is an extremely risky undertaking. Typically, transportation infrastructures have been disrupted, for example, by natural disasters or political or social upheaval. It is often difficult or impossible to truck relief supplies to the disaster area because roads are destroyed and/or access points are blocked. In addition, the relief workers themselves are placed in danger, which may be from environmental concerns (e.g. floods, mudslides, earthquakes, radiation) or dangerous military actions on the ground. Providing supplies by air is often the only viable option in a disaster, but there are still many problems. Because supplies are provided in bulk, the process generally requires precise targeting and coordination with those on the ground to avoid damage to the supplies themselves, damage to structures on the ground, and harm to persons and animals. Whether delivered by truck, ship, or aircraft, supplies are often stolen or confiscated by governments or persons wishing to establish regional political or military dominance. Consequently, the cost of delivery is high and the effectiveness of providing real relief is minimal.

It has been surprisingly discovered that a cost-effective pack of supplies can be manufactured and air dropped for distribution to large numbers of people with a minimized risk of damage to structures on the ground, to the supplies themselves, and with minimal risk of harm to people and animals on the ground, all while maximizing the receipt of supplies to those in need. Whereas conventional delivery methods typically maximize the quantity delivered, such as bulk delivery by truck, ship, or air, the invention described herein is directed to delivering large numbers of low-weight packs by air so that the packs are distributed evenly and randomly over a large predetermined area. Delivering large numbers packs over a region makes it difficult or impossible for all supplies to be stolen or otherwise sequestered by individuals who are not the intended recipients. This effectively destroys the black market potential that can be created when supplies are delivered in bulk, whether that delivery is by truck, ship or air, and, more importantly, maximizes the quantity of supplies received by the targeted persons.

Preferably, each pack is configured as a single delivery unit and packs are delivered in large numbers, so the risk of supplies not reaching the intended victims or being otherwise stolen is minimized. As aspect on the invention is therefore the rapid construction and assembly of packs in large numbers. Single station, and semi automated manufacturing apparatus are configured to produce thousands to tens of thousands of packs per day. Packs preferably contain one or only a few rations of the supplies such as, for example, food, water, or medicine. Although the supply lasts for a short time, because costs are minimized, deliveries can be repeated many times and with minimal risk to those involved. Importantly, because packs are delivered by air, relief workers never need to enter the disaster area itself. Also, depending on the aerodynamic components of the pack, distribution can be from almost any altitude, again keeping relief workers safe from danger.

Packs are capable of being distributed or broadcast over a wide area or targeted to a precise or limited location, again so as to minimize the risk of theft and/or to reach a target area that is itself limited or small. The range is preferably pre-determined so as to maximize distribution to individuals in need as compared to palette distribution by truck, air, or ship.

Packs are configured to possess an aerodynamic component to reduce or eliminate acceleration produced by gravity. Because pack weights are small as compared to bulk supplies, the aerodynamic component is correspondingly minimized. Preferably the packs themselves are aerodynamically designed so that the rate at which the packs fall to the ground is minimized as compared to freefall. Preferably the packs hit the ground at speeds that pose little to no risk of damage to structures, other things on the ground, or the contents of the packs themselves, and little to no risk of harm from to persons or animals (i.e. from the pack landing on a person or animal during descent). The rate and speed are precisely controlled by the aerodynamic component of the pack itself by introducing one or more drag and/or lift elements. Drag can be induced from lift or parasitic as a consequence of the structure of the component. Aerodynamic components that can be added include, but are not limited to one or more wings, fins, tail structures, propellers or rotary blades, airfoils, sails or parasails, streamers, tunnels, dimples, vent slits, scalloped edges, serrated edges and parachutes. Preferably, wings or airfoils are configured to force the pack to circle or oscillate while descending so as to localize pack delivery to a limited area. While weather conditions can still be problematic, when known or predicted in advance, specific aerodynamic components can be configured by one skilled in the art to adjust the trajectory of the packs and therefore account for expected transverse movement of the pack through the air while descending. Also, pack distribution can be monitored by radar (e.g. doppler) or tracking devices within each pack (e.g. GPS) to plot broadcast distribution patterns over various terrain and in various weather conditions. Those patterns can be used to determine optimal distribution or determine if re-distribution is necessary. Design configurations may include, for example, ailerons and rudder structures that may be fixed to predetermined positions, wings and/or leading edges set at a predetermined shape or angle of attack, asymmetric loading of the supplies in the pack itself and/or combinations thereof.

Alternatively, packs and also boxes containing multiple packs may be rendered transparent or invisible to radar by coating pack and/or box walls with radar absorbing materials such as, for example, carbon fiber and/or carbon nanotubes including single-walled, double-walled and/or multi-walled carbon nanotubes. Walls may also be angled to provide packs and/or boxes with a low radar profile. Packs and/or boxes may also be camouflaged with color to render packs invisible from the ground or at least difficult to spot and track in the air as they descend. Preferred colors include traditional camouflage patterns, or solid colors or patterns of sky blue, snow white, gray, brown, green, sand colored, dark blue, and black. Packs and/or boxes may also be colored differentially so that the chosen color renders the pack largely invisible when looking up and difficult to see when on the ground such as, for example, by using boxes with sky blue bottom and black tops.

Preferably, packs, including the aerodynamic components, are manufactures as single units to minimize manufacturing costs. Also preferable, supply items are inserted into the packs during the manufacturing process, again to minimize costs.

As embodied and broadly described, the disclosures herein provide detailed embodiments of the invention. However, the disclosed embodiments are merely exemplary of the invention that is embodied in various and alternative forms. Therefore, there is no intent that specific structural and functional details should be limiting, but rather, the intention is that they serve as a representative basis for teaching one skilled in the art to variously employ the present invention.

FIGS. 1-10 illustrate a pack 10 with an item 11 for aerial delivery. The pack 10 includes an inner package 12 and an outer package 14. The inner package 12 may be disposed along a substantially central longitudinally extending axis of the outer package 14, for example. The inner package 12 either is the item 11 for aerial delivery, or houses the item 11 for aerial delivery. For example, the item 11 may be a mosquito net or water disposed in the inner package 12. In the embodiment shown, each of the inner package 12 and the outer package 14 of the pack 10 has a quadrilateral shape in plan view. It should be appreciated that the inner package 12 and the other package 14 may have other shapes in plan view, such as a circle, an oval, a triangle, an asymmetrical shape, and the like, as desired. Likewise, an overall size of the pack 10 will depend on a number of factors, including the size and weight of contents of the inner package 12, including the item 11 for delivery. In a preferred embodiment, the dimensions of the outer package are 300 mm by 150 mm, 350 mm by 200 mm, 400 mm by 300 mm, 450 mm by 200 mm, or another size. The ratio of size to weight can be adjusted as required to change the aerodynamic features of the pack 10.

The outer package 14 may be formed from a polymeric material, such as polyethylene, for example. In certain embodiments, the outer package 14 is formed from a biodegradable material, such as, for example, a polyvinyl alcohol (PVA), polyethylene (PE), polypropylene (PP), or polystyrene (PS). Plastic boxes have the advantage of allowing for extrusion manufacturing and sealing of the boxes with heat to fuse the plastic materials providing a barrier to moisture and other substances, e.g., rendered water-tight. In preferred embodiments, the outer package 14 may also be formed from a mesh material. In preferred embodiments, the outer package 14 is formed from a high performance barrier plastic. For example, the high performance barrier plastic can be an oxygen or carbon dioxide scavenger or barrier. Additionally, outer package 14 may be made of numerous layers and/or corrugated to provide strength. For example, outer package 14 may have inner and outer layers of polyethylene and a middle layer of rip-stop nylon. In preferred embodiments, outer package 14 may be coated with a low friction coating (e.g. a lubricant, talcum powder, Teflon, an oil, or graphite). Furthermore, there may be adhesive between the layers, layers that promote heat seals, and layers that provide optical clarity or opaqueness. Furthermore, the thickness of outer package 14 can vary depending on the desired attributes of the pack 10. A skilled artisan may select suitable materials and number of layers for the outer package 14, as desired.

The inner package 12 is disposed inside the outer package 14. Where the inner package 12 houses item 11, the contents of the inner package 12 may dictate the particular material used to form the inner package 12. For example, the material forming the inner package 12 may be dictated by a desired shelf-life and storage time of the item 11 housed by the inner package 12. In preferred embodiments, the inner package 12 is formed from a polymeric material, such as, for example, PE, PVA, PS and/or PP. The inner package 12 may alternatively be formed from any conventional material known in the packaging industry, materials such as a cardboard, a metal, a plastic, a fabric or a combination of the foregoing, as examples. Furthermore, inner package 12 may be made of or contain a cushioning material. For example, inner package 12 may be formed from bubble wrap or foam.

As non-limiting examples, the inner package 12 may contain or be non-perishable items 11, such as mosquito netting, a blanket, tools, illuminating devices, batteries, tents or other shelter, rain suits or other clothing and foot protection, toilet tissue, cleansing wipes, ammunition, dental hygiene supplies, parts required for vehicle or equipment repair, hunting and fishing tools, water purification pills, a filtered drinking straw to remove contaminants from water, communication and/or navigation devices, heating devices such as those chemically activated to generate heat, and video or paper informational instructions furnished to victims of a natural disaster or war. Other types of non-perishable items 11 may also be housed by the inner package 12, within the scope of the present disclosure.

Where the contents of the inner package 12 are non-perishable, the inner package 12 may particularly be formed from a biodegradable material, such as a polyvinyl alcohol (PVA), for example, or from a perforated material. Furthermore, the inner package 12 may include one or more tabs coupled to each end of the item 11 contained therein and to the outer package 14. The tabs facilitate a removal of the inner package 12 from the outer package 14, for example.

The inner package 12 may also be used for delivery of perishable items 11. For example, the inner package 12 may contain a food or a liquid that requires a substantially fluid and/or light and/or air impermeable material. Where the contents of the inner package 12 are temperature or light sensitive, such as a medication, or flammable, such as fire-starting kits, magnesium blocks for starting fires, or fuels, the inner package 12 may be formed from a thermally insulating material, for example, a metallic or composite foil. The inner package 12 may also include a heating or cooling substance or a device to maintain the contents of the inner package 12 at a desired temperature. The heating or cooling substance or device may also be contained by the outer package 14 and not merely the inner package 12. Medicinal contents of the inner package 12 may include insulin, tetanus vaccinations, Dengue-fever vaccinations, malaria vaccinations, antibiotics, and the like, as non-limiting examples. Other types of perishable items 11 may also be housed by the inner package 12, as desired.

The outer package 14 and the inner package 12 may be formed from the same material or from different materials, as desired. A skilled artisan may select suitable materials for the inner package 12 and the outer package 14, as desired.

Figure 4:
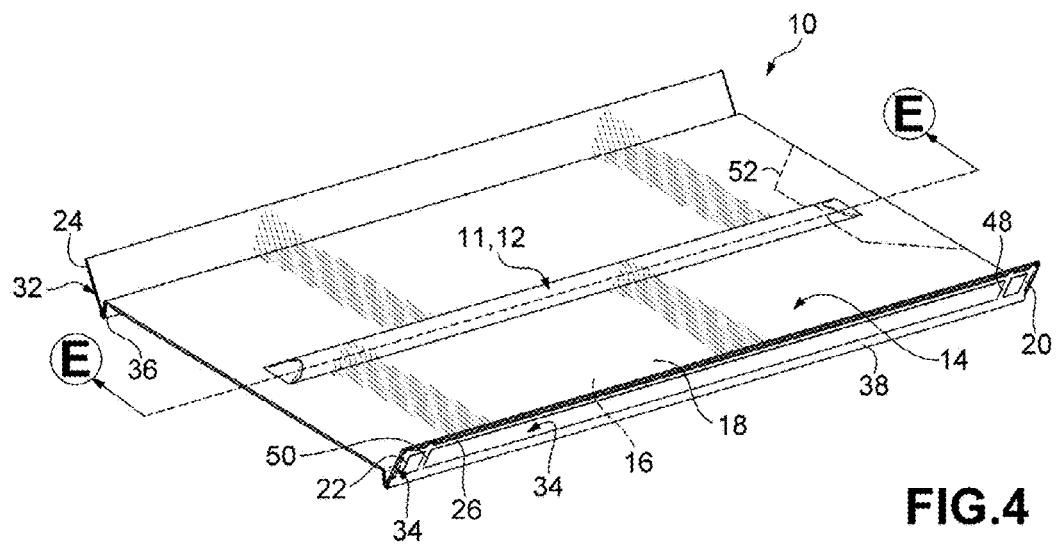
FIG. 4 is a bottom perspective view of the emergency pack illustrated in FIGS. 1-3, the emergency pack shown in a flight position.
Figure 5:
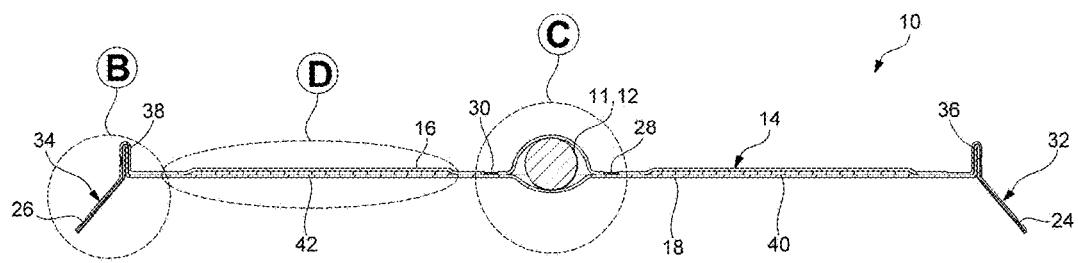
FIG. 5 is a cross-sectional front elevational view of the emergency pack taken at section line A-A in FIG. 3.
Figure 6:
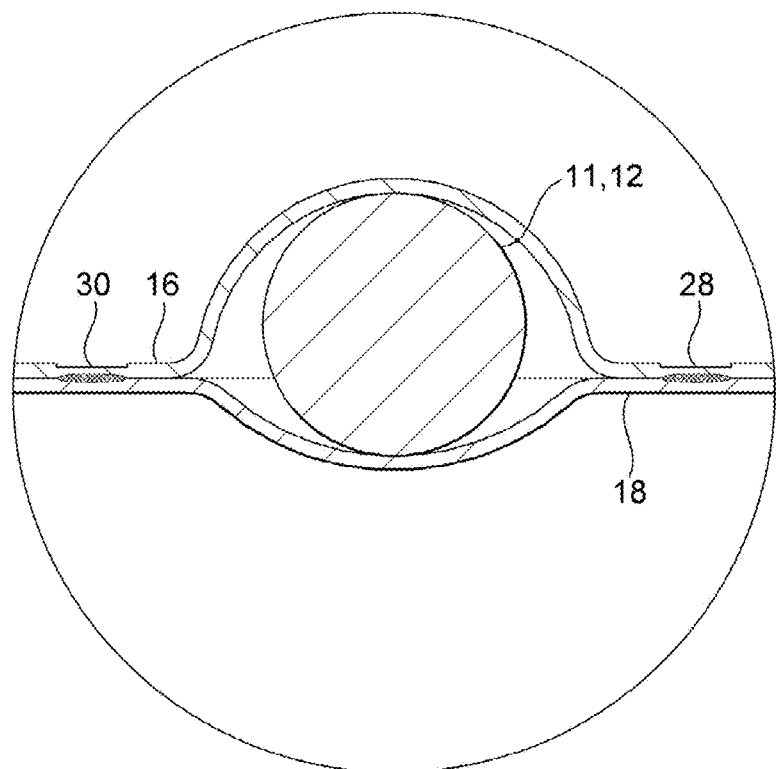
FIG. 6 is a fragmentary enlarged cross-sectional front elevational view of the emergency pack taken at callout B in FIG. 5, further showing an inner package of the emergency pack.

With renewed references to FIGS. 1-10, the outer package 14 is formed from a pair of superposed sheets 16, 18, having facing surfaces that are joined together. The top edges of the sheets 16, 18 are sealed together to form a top edge seal 20 of the pack 10. Likewise, the bottom edges of the sheets 16, 18 are sealed together to form a bottom edge seal 22 of the pack 10. The side edges of the sheet 16 are sealed to corresponding side edges of the sheet 18 to form a pair of opposing side edge seals 24, 26 of the pack 10. The facing surface of the sheets 16, 18 adjacent the inner package 12 are sealed together to form mid-pack seals 28, 30 of the pack 10. The top edge seal 20, the bottom edge seal 22, and the mid-pack seals 28, 30 confine the inner package 12 within the outer package 14, for example, as shown in FIG. 6.

Figure 2:
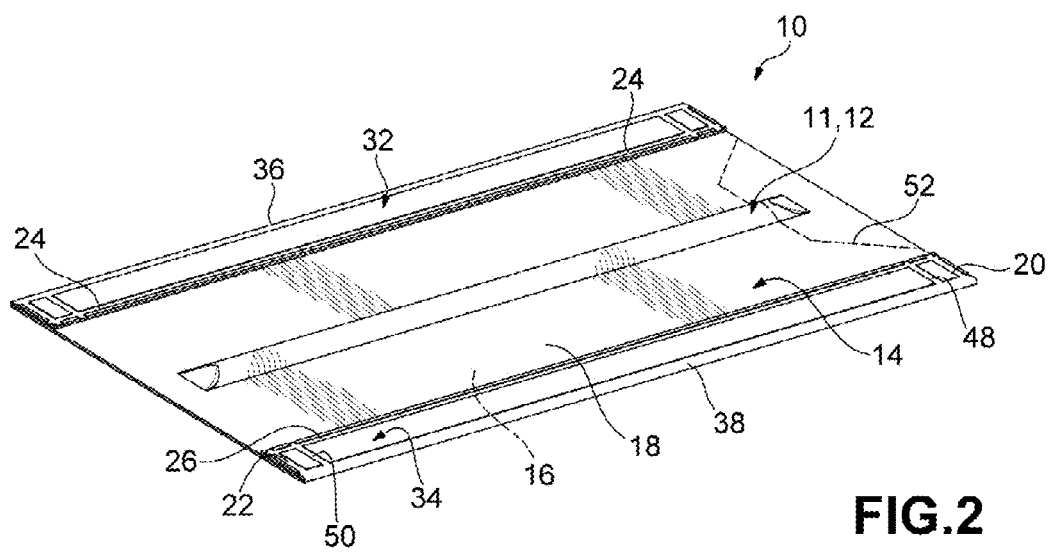
FIG. 2 is a bottom perspective view of the emergency pack illustrated in FIG. 1, the emergency pack shown in a formed position.
Figure 3:
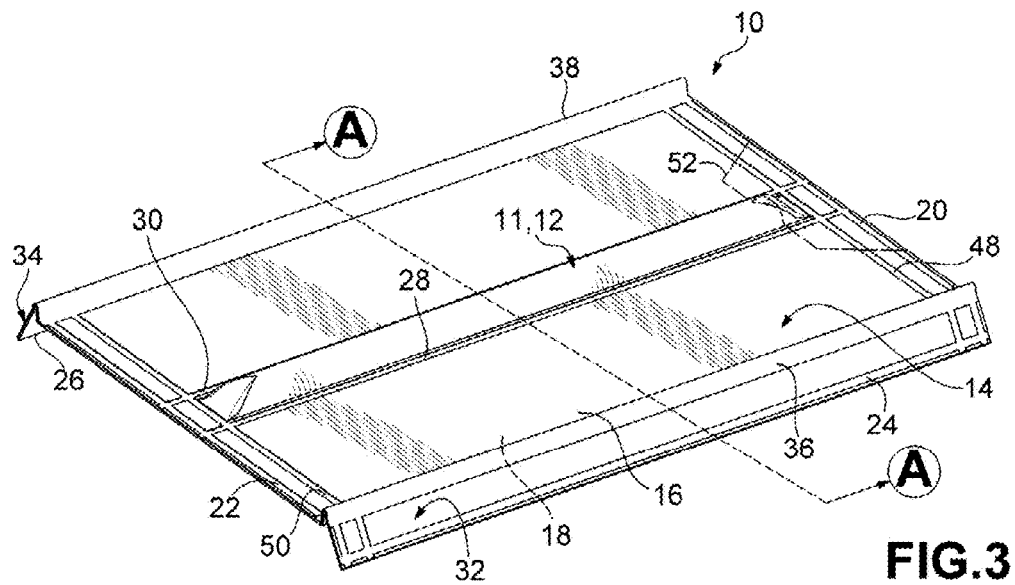
FIG. 3 is a top perspective view of the emergency pack illustrated in FIGS. 1-2, the emergency pack shown in a flight position.
Figure 7:
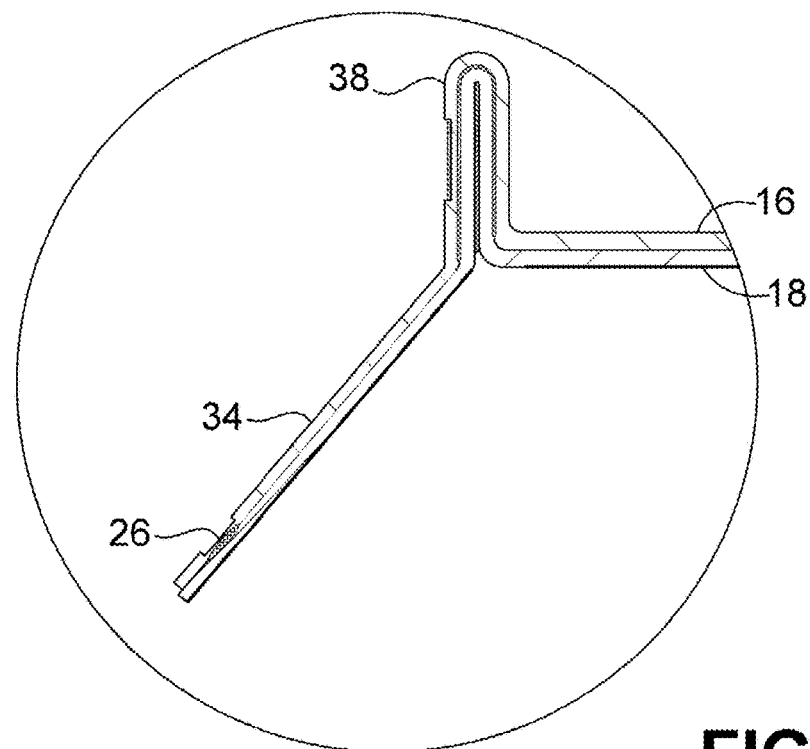
FIG. 7 is a fragmentary enlarged cross-sectional front elevational view of the emergency pack taken at callout C in FIG. 5, further showing a wing of the emergency pack.

The outer package 14 includes at least one aerodynamic component 32, 34. Aerodynamic component 32, 34 preferably creates drag during the free fall of pack 10 during use thereby slowing the descent of pack 10. Additionally, aerodynamic component 32, 34 may provide aerodynamic and stability characteristics such as lift, directional control, thrust, or weight. In the embodiment shown in FIG. 1-10, the at least one aerodynamic component 32, 34 includes a pair of flanges or wings 32, 34 formed between the side edge seals 24, 26 and the mid-pack seals 28, 30 of the pack 10. The wings 32, 34 are formed by folding corresponding side edges of the sheets 16, 18 and sealing the folded edges to form wing seals 36, 38, for example, as shown in FIGS. 5 and 7. As a result of sealing the folded edges to form the wing seals 36, 38, the wings 32, 34 normally are closed and extend inwardly along a longitudinal axis of the pack 10. The wings 32, 34, which as shown in FIGS. 1-2 are normally closed in the pack 10, unfurl as shown in FIGS. 3-4 as the pack 10 is dropped through the air. While two wings 32, 34 are depicted, any number of wings can be used. Figure depicts the stages of forming wings 32, 34. Pack 10 is feed into the wing forming mechanism at infeed 205, the first portion of the wings are formed at forming area 210, the second portion of the wings are formed at forming area 215, the third portion of the wings are formed at forming area 220, the forth portion of the wings are formed at forming area 225, the fifth portion of the wings are formed at forming area 230, the edges of the wings are sealed at edge sealing 235, the pack 10 enters reflex area 240 where the wings are flexed open 245, and finally the pack 10 is sent to the packout area 250. The individual packs are separated from the joined packages being produced via a guillotine type cutting device and then subsequently sent to packout areas.

Figure 18:
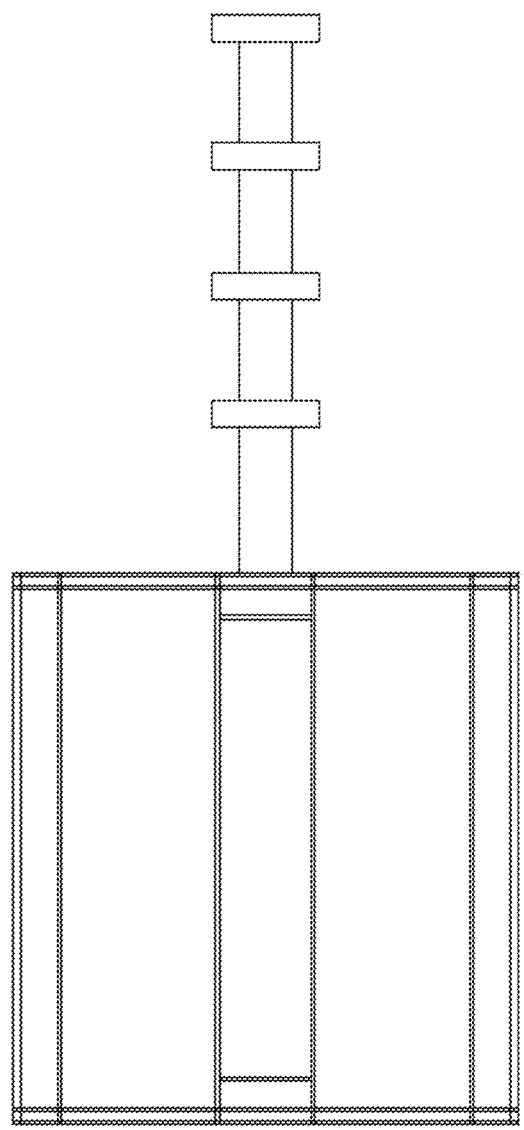
FIG. 18 is an embodiment of the pack having a tail.
Figure 19:
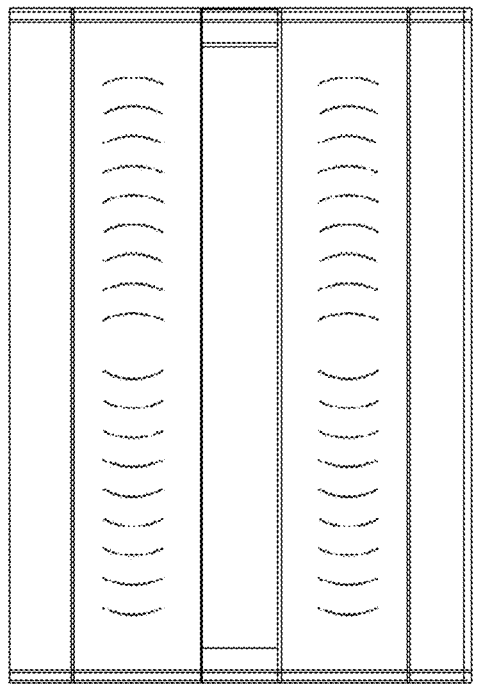
FIG. 19 is an embodiment of the pack having vent slits.
Figure 20:
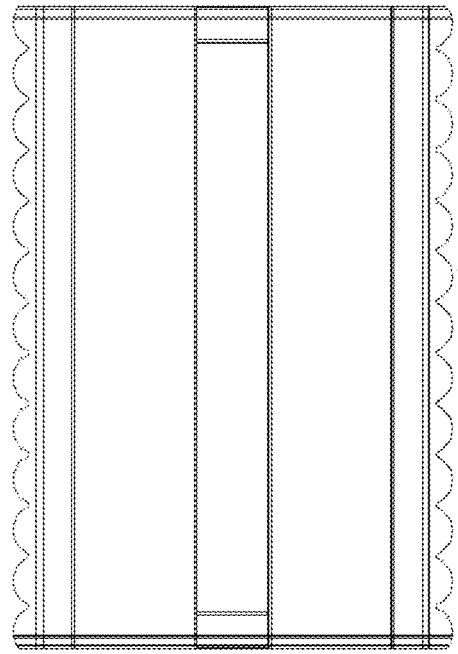
FIG. 20 is an embodiment of the pack having scalloped edges.
Figure 21:
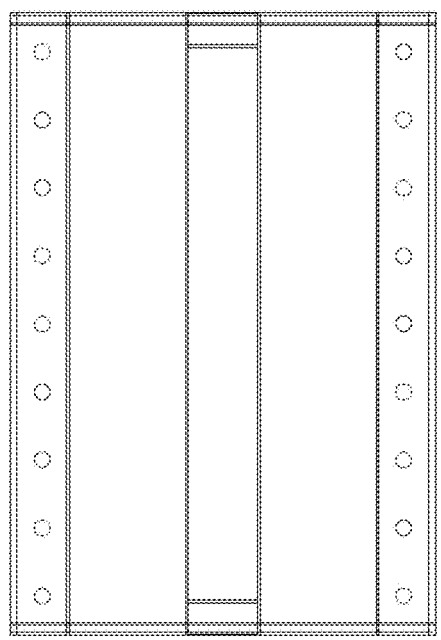
FIG. 21 is an embodiment of the pack having holes in the wings.

The at least one aerodynamic component 32, 34 may advantageously cause turbulent flow, as opposed to laminar flow, across the outer package 14 and decrease a descent rate of the pack 10 in operation. Preferably, the velocity of pack 10 is reduced from freefall to, for example, 20 meters per second, 15 meters per second, 10 meters per second, 8 meters per second, or 5 meters per second. Preferably, the impact with the ground of pack 10 is reduced from the impact of the pack with ground during freefall, for example, by 90%, 75%, 60%, 50% or another percentage. Although the embodiments shown in FIGS. 1-10 include wings 32, 34 as the at least one aerodynamic component 32, 34, one of ordinary skill in the art should understand that the at least one aerodynamic component 32, 34 may alternatively include a tail, a fin, an airfoil, a parasail, a parachute, rotary blades, streamers or a tail (see FIG. 18), or other structure adapted to create drag when the pack 10 is dropped through the air. As a non-limiting example of other types of structure, tunnels, dimples, vent slits (see FIG. 19), scalloped or serrated edges (see FIG. 20), or holes formed in the outer package 14 may be used to for create turbulent flow. Suitable aerodynamic component 32, 34 for the pack 10 may be selected, as desired. Furthermore, a combination of aerodynamic elements can be used. For example, as shown in FIG. 21, holes can be punched into wings 32, 34 to further control drop rate and/or flight characterizes.

Figure 26:
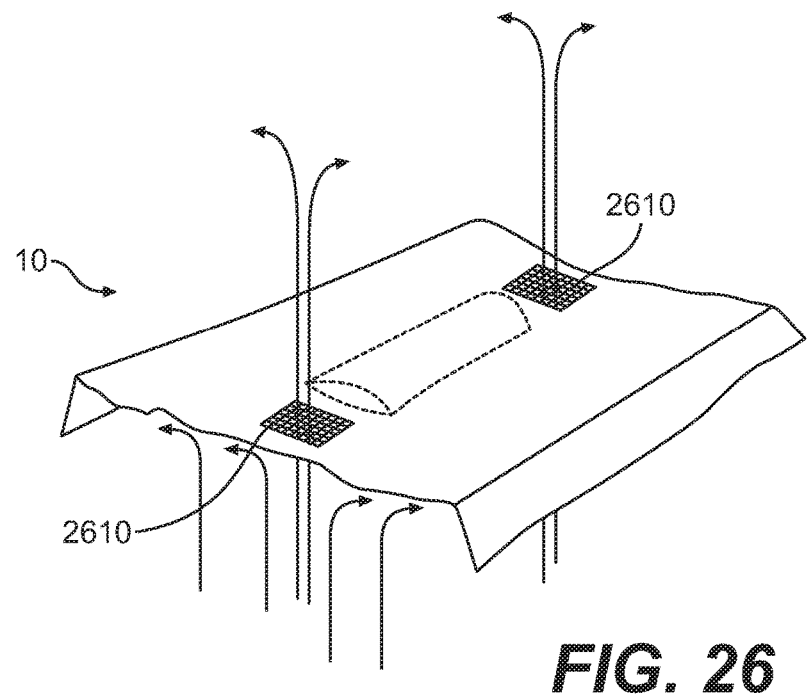
FIGS. 26-28 depict embodiments of the pack having air vents.
Figure 27:
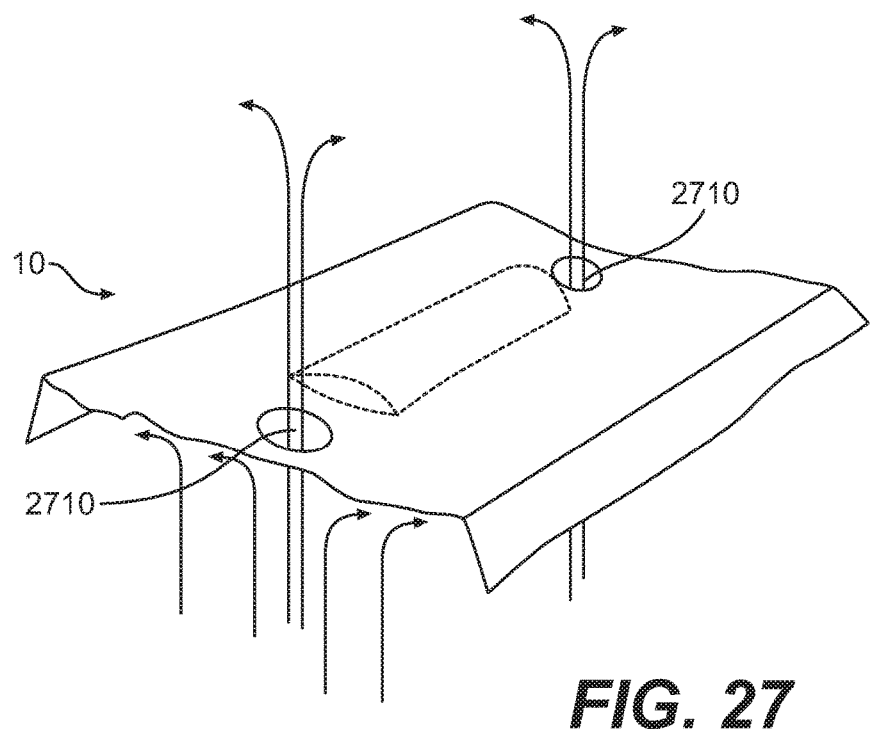
Figure 28:
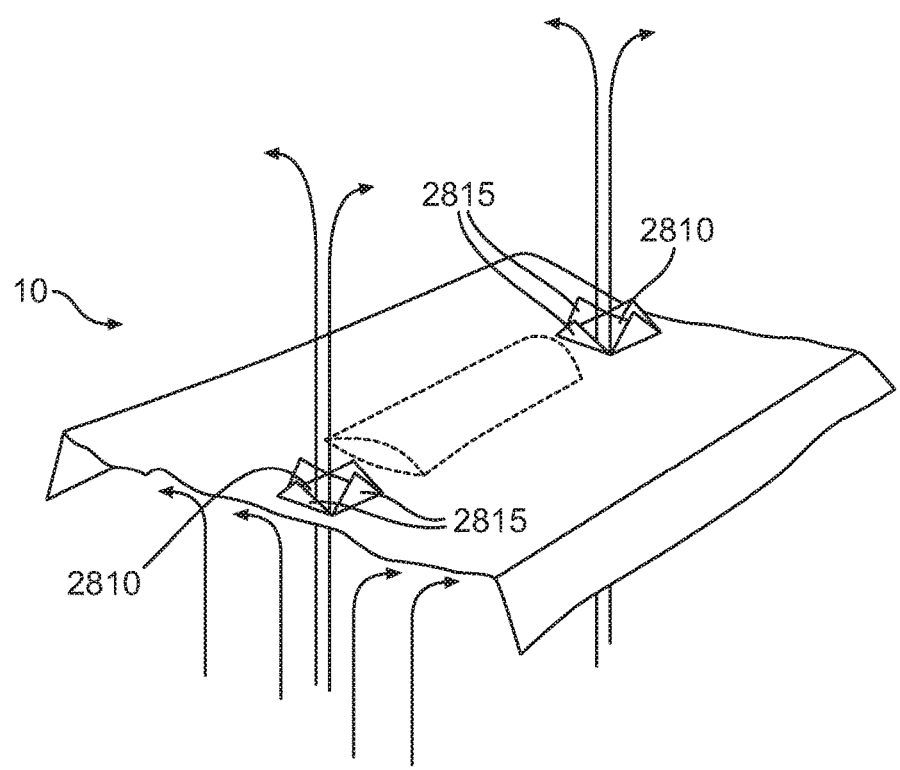

FIGS. 26, 27 and 28 show additional embodiments of a pack 10. The embodiments shown in FIGS. 26, 27 and 28 include air vents 2610, 2710, and 2810. Preferably, air vents 2610, 2710, and 2810 allow a portion of air the air passing over pack 10 to, instead, pass though pack 10 as pack 10 descends. Such airflow increases the ability of the packs to separate from each other during deployment and changes the aerodynamics of the packs. Air vents 2610, 2710, and 2810 can be positioned at the ends of pack 10, on the sides of pack 10, in the middle of pack 10, or at another location. Furthermore, there can be multiple air vents 2610, 2710, and 2810 and a combination of air vents 2610, 2710, and 2810 through pack 10. Each of the apertures for air vents 2610, 2710, and 2810 penetrates at least one portion of the upper surface of pack 10 and one portion of the lower surface of pack 10. The apertures in the upper and lower surfaces of pack 10 can be in-line or apart from each other, thereby allowing air into pack 10 through one aperture and allowing air to exit pack 10 through another aperture.

Air vent 2610 is preferably comprised of a mesh screen or another air permeable material. While air vent 2610 is shown as square in shape, air vent 2610 can have another shape (e.g. rectangular, ovular, circular, or triangular). Air vent 2710 is preferably a cutout from the body of pack 10. While air vent 2710 is shown as ovular in shape, air vent 2610 can have another shape (e.g. rectangular, square, circular, or triangular). Air vent 2810 is preferably a cutout from the body of pack 10 with flaps 2815 coupled to the perimeter of air vent 2810. Preferably, flaps 2815 are of the same material as the body of pack 10, however flaps 2815 can be of another material. In a preferred embodiment, flaps 2815 are created by cutting an "X" into the body of pack 10, however flaps 2815 can be attached to pack 10 (e.g. with adhesive or fused to pack 10). While air vent 2810 is shown as square in shape, air vent 2810 can have another shape (e.g. rectangular, ovular, circular, or triangular).

In certain embodiments, the aerodynamic component 32, 34 control the flight path of the pack 10. For example, wings may be formed to force the pack 10 to follow a spiral descent, a zigzag descent, or a descent similar to an airplane that is landing. Such controlled descent improves the accuracy of delivering packs 10 to a desired location.

Figure 8:
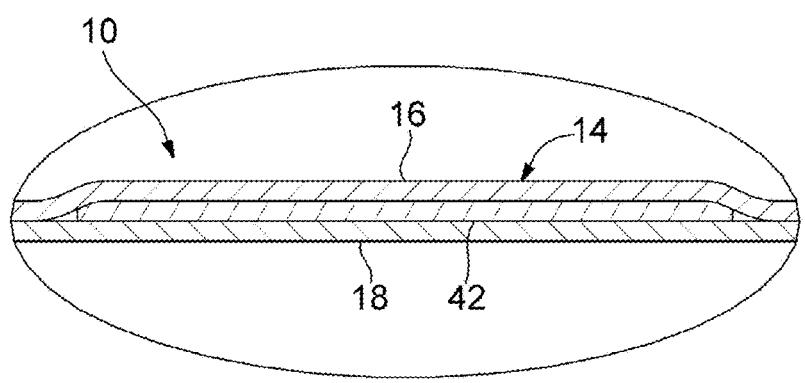
FIG. 8 is a fragmentary enlarged cross-sectional front elevational view of the emergency pack taken at callout D in FIG. 5, further showing a rigid insert in an outer package of the emergency pack.
Figure 22:
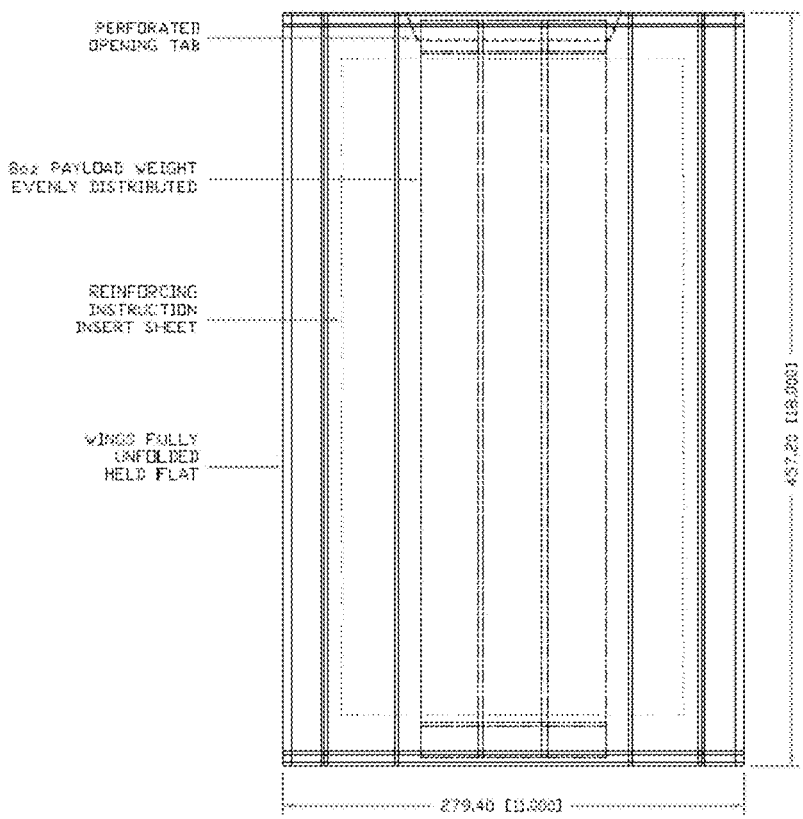
FIG. 22 is an embodiment of the pack having a reinforcing instruction insert sheet.

In certain embodiments, the outer package 14 is formed from a substantially rigid material adapted to militate against a folding of the pack 10. With reference to FIGS. 5 and 8, the outer package 14 may also include at least one rigid insert 40, 42 adapted to provide structural support to the outer package 14 and militate against an undesirable folding of the pack 10 in operation. For example, the rigid inserts 40, 42 may be elongate members sealed and disposed between the mid-pack seals 28, 30 and the wing seals 36, 38 of the outer package 14. The rigid inserts 40, 42 may include ribs laterally oriented within the outer package 14, or supports longitudinally oriented within the outer package, for example. The rigid inserts 40, 42 may also be coupled to the outer package 14 during the formation of the top edge seal 20 and the bottom edge seal 22. It is understood that the inserts 40, 42 may be coupled to the top edge seal 20 and the bottom edge seal 22, as desired. The inserts 40, 42 may also be disposed adjacent the inner package 12 or coupled to an exterior of the outer package 14. In a preferred embodiment, the rigid inserts 40, 42 may include stiff or folded paper informational instructions for users of the contents of the pack 10 (see FIG. 22). In other embodiments, the rigid inserts 40, 42 are cardboard or plastic inserts having a stiffness sufficient to militate against a folding of the outer package 14. One of ordinary skill in the art may select a suitably rigid material for the inserts 40, 42, as desired with maintaining the desired flexibility. Outer package 14 can also have embossed surfaces, vacuum sealed portions, pressurized chambers and/or chambers filled with gas (e.g. helium, hydrogen, or air) to adjust the stiffness of the pack 10.

Figure 9:
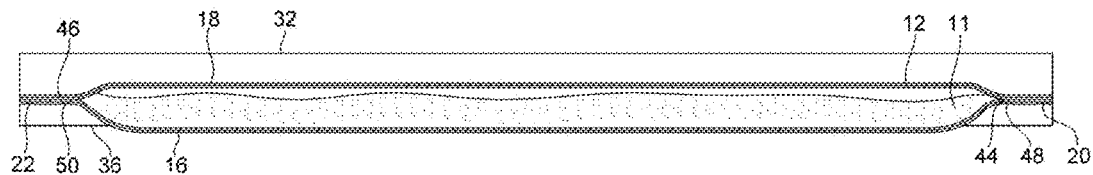
FIG. 9 a cross-sectional side elevational view of the emergency pack taken at section line E-E in FIG. 4, further showing an inner package of the emergency pack connected with an outer package of the emergency pack according to one embodiment of the disclosure, the inner package shown with a liquid material disposed therein.
Figure 10:
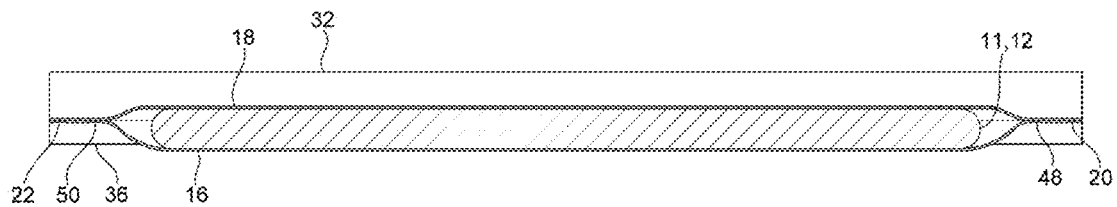
FIG. 10 is a cross-sectional side elevational view of the emergency pack taken at section line E-E in FIG. 4, the inner package of the emergency pack shown consisting of a solid material.
Figure 23:
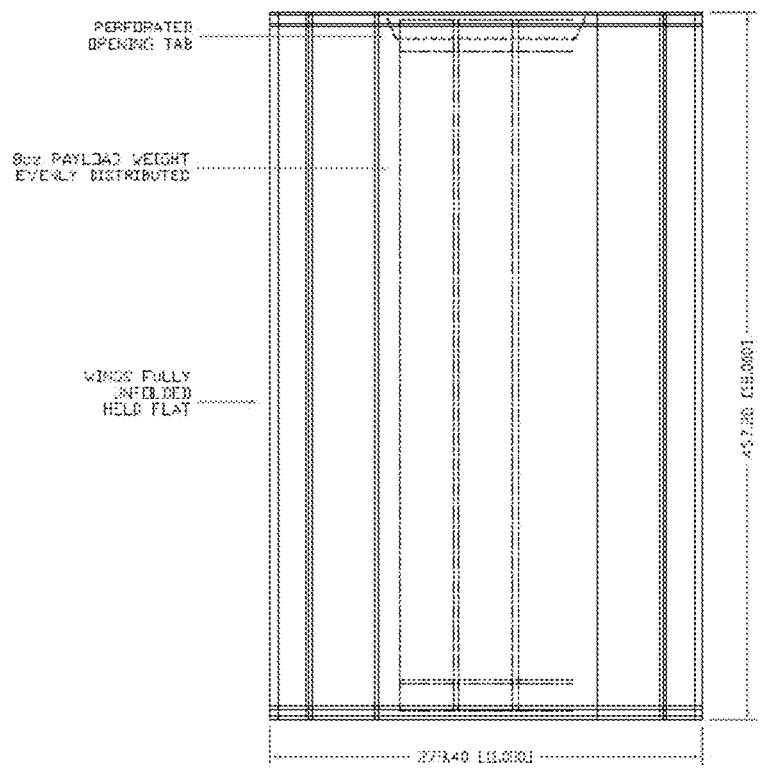
FIG. 23 is an embodiment of the pack having an evenly distributed payload.

As established hereinabove, the inner package 12 either is the item 11 for aerial delivery, or houses the item 11 for aerial delivery. As shown in FIG. 9, where the inner package 12 houses the item 11 for delivery, for example, water, the inner package 12 may be coupled with the outer package 14. In particular, a top edge 44 and a bottom edge 46 of the inner package 12 may be sealed between the sheets 16, 18 with a top transverse seal 48 and a bottom transverse seal 50, respectively. As shown in FIG. 10, where the inner package 12 is the item 11 for aerial delivery, the inner package may be loosely disposed between the sheets 16, 18 of the outer package 14. A plurality of the items 11 individually, or packaged within a plurality of the inner packages 12, may also be substantially evenly distributed within the outer package 14 of the pack 10. It should also be appreciated that the inner packages 12 may also be substantially evenly distributed along a length of the outer package 14 in order to provide a balanced weight distribution and facilitate the delivery of the pack 10 through the air (see FIG. 23). Other means for disposing the inner package 12 within the outer package 14 of the pack 10, and any number of items 11, may be used as desired. Furthermore, more than one inner package 12 may be disposed throughout outer package 14. Preferably, the inner packages are disposed evenly to evenly distribute the weight throughout outer package 14. In a preferred embodiment, item 11 is allowed to move freely within inner package 12. In a preferred embodiment, pack 10 holds 100 grams, 200 grams, 300 grams, 400 grams, 750 grams, 1 kilogram, 2 kilograms or another amount of item 11. The size, flexibility, aerodynamic element(s), material, and positioning of item 11 can all be adjusted depending on the weight and contents of item 11. Furthermore, item 11 can be position so that pack 10 has a positive static stability, a neutral static stability, or a negative static stability.

Preferably, the content of pack 10 is a single serving or ration of item 11. For example, the contents can be a single serving of water, a single nutrition bar, a first aid kit, or a sanitation kit. In embodiments where pack 10 holds a single serving of item 11, distribution of the packs is achieved during the airdrop since the packs will preferably be evenly and randomly distributed across the drop zone.

It is understood that the various seals 20, 22, 24, 26, 28, 30, 36, 38, 48, 50 of the present disclosure may be formed by a chemical sealing operation, such as by use of an adhesive or a chemical solvent, for example, or by a heat welding operation, as desired. In particularly illustrative embodiments, the various seals 20, 22, 24, 26, 28, 30, 36, 38, 48, 50 are formed by heat sealing operations. Alternative means for forming the various seals 20, 22, 24, 26, 28, 30, 36, 38, 48, 50 may also be employed, as desired.

Figure 24:
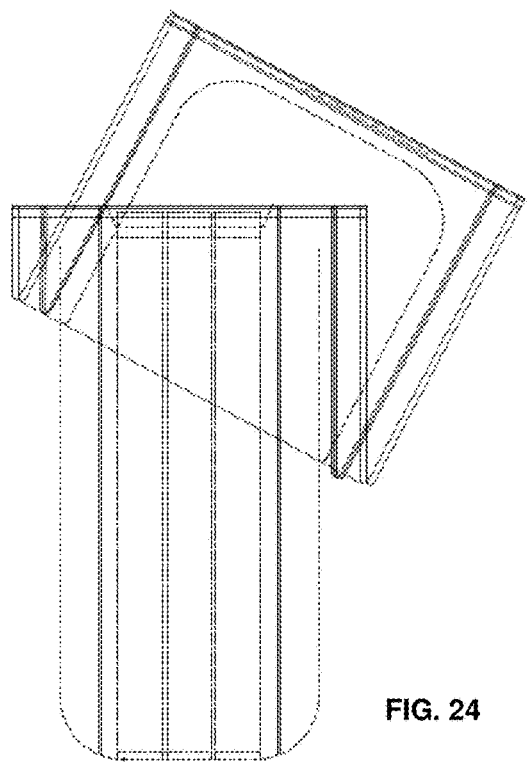
FIG. 24 is an embodiment of the pack having perforations for creating handles.
Figure 25:
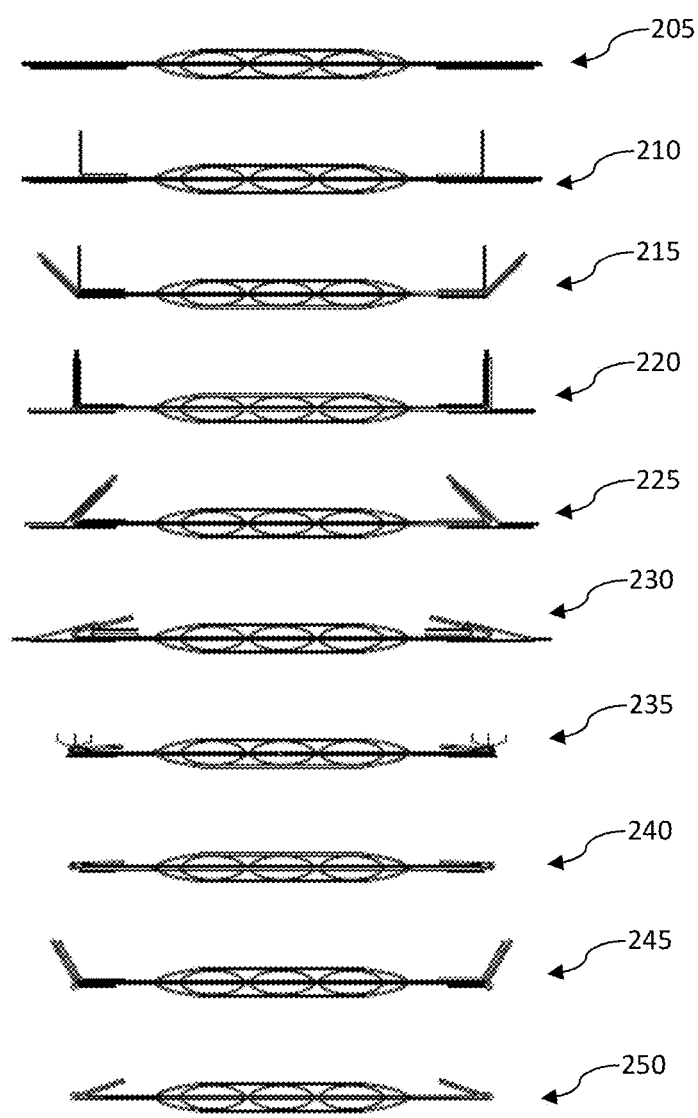
FIG. 25 depicts the formation of the wings.

The pack 10 of the present disclosure may further include a perforation 52 to facilitate an opening of the pack 10. The perforation 52 may be a tamper-proof or tamper-evident perforation 52. The perforation 52 may extend inwardly from an edge of the emergency pack and traverse at least one of the top edge seal 20, the bottom edge seal 22, the top transverse seal 48, and the bottom transverse seal 50, in order that the same seals may be opened to permit access to the inner package 12 and the item 11 for aerial delivery by an end user of the pack 10. Additional, as shown in FIG. 24, perforations may be added to form a pouch with a carrying handle.

As established herein, the outer package 14 is adapted to contain the inner package 12. The outer package 14 may also contain an illuminating device to facilitate visible location of the pack 10, particularly at night, such as a flashing LED, glowing film, or a reflective device, for example. The illumination device may be activated by time, temperature, pressure, or impact, for example. Alternatively, the outer package 14 may be formed from a radar reflective material or a radar dissipating coating. In certain embodiments, the outer package 14 is formed from or coated with a light-activated substance. The outer package 14 may also contain a tracking device such as a GPS device, an RFID device, and the like to facilitate tracking of the pack 10 or for inventory control. Furthermore, the packaging may contain a noise generating device. For example the packaging may contain a whistle, buzzer, or beeper that is activated as the air passes over the packaging, electrically, or mechanically. The noise generating device can announce the arrival and location of the packs as they drop or at the drop location. In certain embodiments, pack 10 has no moving parts, electric parts, or mechanical parts.

The outer package 14 may include and/or contain indicia. The indicia may include a colored material or a symbol to indicate the contents thereof. For example, blue indicium may indicate that the item 11 is water, a Red Cross indicium may indicate that the item 11 includes medical supplies, and the like. The indicia may also include instructions in a plurality of languages or graphical instructions for opening the pack 10 and to indicate the use of the contents thereof. In certain embodiments, the packs 10 may be colored. For example, the packs 10 may be blue, maroon, yellow, beige, or patterns such as plaid or polka-dotted. Additionally, the pack 10 may have a solar film with a printed circuit device coupled to the pack. The device can be used for communication and/or navigation proposes by receiving and sending AM/FM or shortwave signals.

To aerially distribute the packs 10, a skilled artisan may select any suitable aerial distribution system, as desired. As non-limiting examples, the distribution system may be substantially as described in U.S. Pat. No. 4,349,168 entitled "Cargo Delivery System for Aircraft," hereby incorporated herein by reference in its entirety; U.S. Pat. No. 4,241,890 entitled "Aerial Delivery System," hereby incorporated herein by reference in its entirety, and U.S. Pat. No. 4,374,578 entitled "Aerial Cargo Delivery System," hereby incorporated herein by reference in its entirety.

Figure 29A:
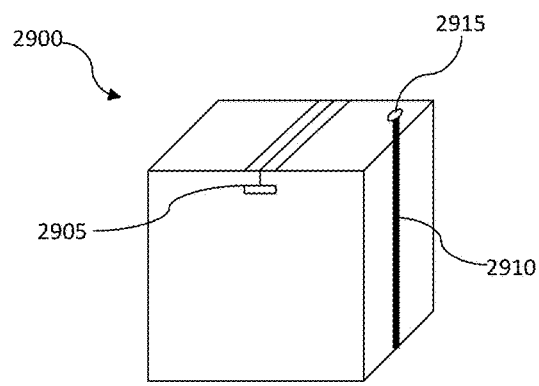
FIGS. 29a-b are views of an embodiment of a storage and deployment container.
Figure 29B:
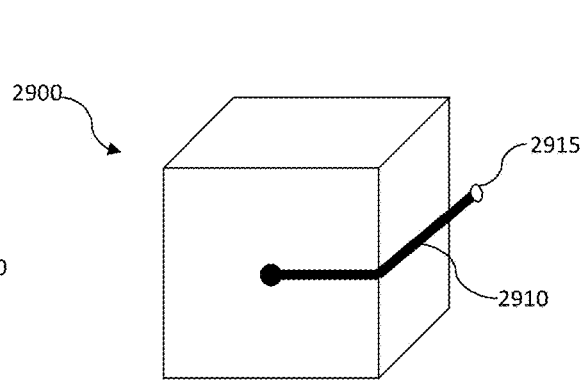

FIGS. 29a and 29b depict an embodiment of an aerial storage and distribution container 2900. Container 2900 is preferably made of cardboard. However container 2900 can be made of other materials, for example, plastic, metal, nylon, wood, cloth, rubber, Styrofoam, or other naturally occurring or manmade materials. While container 2900 is shown as a cube, container 2900 can have other shapes. For example container 2900 can be a cylinder, a pyramid, a cuboid, a cone, bag (for example as depicted in FIGS. 35a-c), bladder bag (e.g. for attachment to the bottom of a helicopter), or a prism. In the preferred embodiment, multiple containers 2900 can be stacked one on top of another. Each container 2900 is preferably able to hold up to 5,000 packs 10, however each container 2900 can hold more or less packs 10.

In the preferred embodiment, the upper surface of container 2900 is sealed with an adhesive tape that includes a pull cord 2905. Pull cord 2905 is preferably embedded in the adhesive tape and when pulled, prior to deployment of the contents of container 2900, pull cord 2905 divides the adhesive tape along a seam in the upper surface of container 2900. In other embodiments, container 2900 can be temporarily sealed with glue, bolts, brads, rivets, screws, nails, interlocking lids, friction lids, screw top lids, other adhesives, locks, twine, rope, or other fastening devices.

Preferably, there is a tether 2910 coupled to the bottom surface of container 2900 (as shown in FIG. 29b). Tether 2910 can be coupled to the bottom surface of container 2900 by adhesive, bolts, rivets, brads, screws, nails or another fastening device. Furthermore, tether 2910 can be incorporated into the material of the bottom surface of container 2900 or can be coupled to the inside of container 2900 through a hole in the bottom surface of container 2900. Tether 2910 may be temporarily affixed to a side of container 2900 (as shown in FIGS. 29a and 29b) with adhesive, bolts, rivets, brads, screws, nails, twine, rope or another fastening device. Tether 2910 is preferably made of a flexible, high strength, inelastic material, such as nylon, rubber, chain, plastic, or other naturally occurring or manmade materials. In the preferred embodiment, tether 2910 has a loop 2915 at the end of tether 2910 opposite the end that is coupled to container 2900. Loop 2915 may be couplable to a static line in an aircraft or another portion of an aircraft.

In the preferred embodiment, tether 2910 is affixed to a surface of container 2900 that is parallel to pull cord 2905 (as shown in FIGS. 29a and 29b). However, tether 2910 can affixed to a surface of container 2900 that is perpendicular to pull cord 2905. Container 2900 may have handholds. The handholds can extend from the body of container 2900 or may be cut into the surface of container 2900. The bottom surface of container 2900 may additionally have a slider coupled thereto. The slider assists in forcing container 2900 out of the vehicle and distributing the contents. For example, the slider can be a low friction disk, a semispherical plastic device, rollers, casters, wheels, or another device.

Container 2900 can be reusable or recyclable or repurposed. Additionally, in embodiments where container 2900 is released from the vehicle at the location of deployment, container 2900 may be repurposable for a secondary use. For example, container 2900 may be coated with a waterproof coating so container 2900 can be used as a shelter, container 2900 may be impregnated with a material (e.g. wax) to increase the burning time of container 2900, or container 2900 can be insulated to keep in or out heat.

To deploy the contents of container 2900, in the preferred embodiment, container 2900 is loaded onto a vehicle (e.g. a cargo plane). Depending on the amount of contents that needs to be deployed, one or more containers 2900 can be loaded onto the vehicle.

Once loaded, loop 2915 of tether 2910 is coupled to a static line of the vehicle. Preferably, container 2900 is positioned within the vehicle so that tether 2910 is facing the inside of the vehicle and the opposite side of container 2900 is facing the opening through which the contents will be deployed. Once coupled to the static line, pull cord 2905 is pulled, thereby unsealing container 2900. When the vehicle arrives at the location of deployment, container 2900 is forced out of the vehicle and releases the contents.

Container 2900 may have one or more dispersal aids installed to facilitate the packs 10 exiting container 2900 without clumping or otherwise remaining together. For example, as shown in FIGS. 35a-b, container 2900 may be equipped with a deflector 3590. Deflector 3590 is preferably foam, however other materials can be used (e.g. cardboard, plastic, wood, metal, or other naturally occurring or manmade materials). As the packs 10 exit container 2900, deflector 3590 interferes the exit of the outer rows of packs 10 causing the packs 10 to disperse.

FIGS. 36a-b depict an embodiment of another dispersal aid 3692. Dispersal aid 3692 is preferably a ridged board coupled to a foam pyramid 3694. Pyramid 3694 can alternatively be cardboard, plastic, wood, metal, or other naturally occurring or manmade materials. Dispersal aid 3692 is preferably coupled to an opening in container 2900 and as tether 2910, which is coupled to pyramid 3694, is pulled, dispersal aid 3692 is forced through container 2900 thereby dispersing packs 10. The opening in container 2900 may be secured by adhesive, elastic banding or another fastening device.

Figure 37:
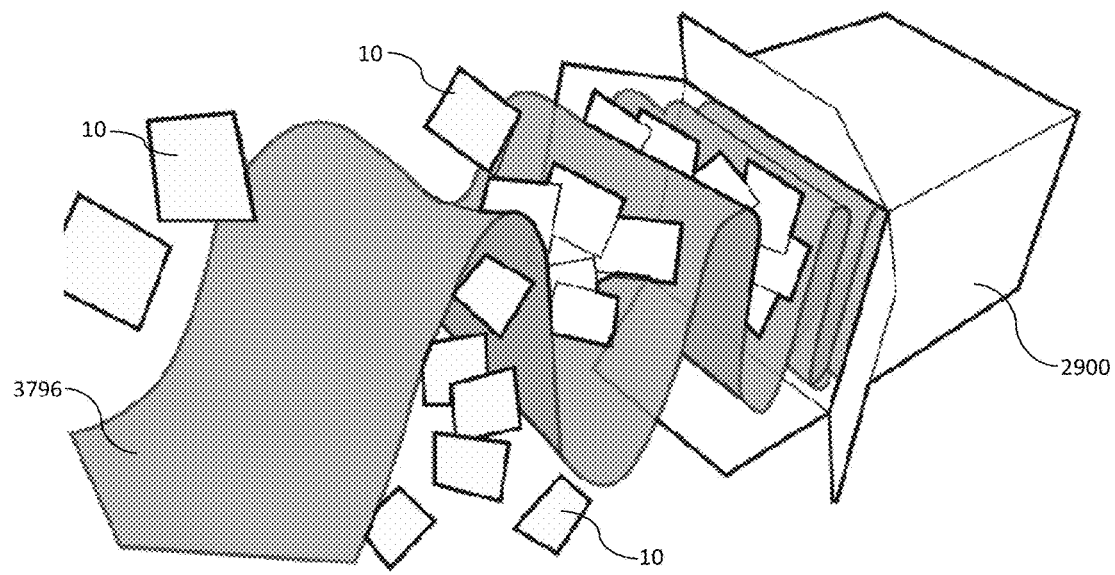
FIG. 37 depicts another embodiment of a disbursement device.

Another embodiment of a dispersal aid is shown in FIG. 37. In the embodiment of FIG. 37, packs 10 are placed between interweaves of a thin sheet of film 3796. Film 3796 can be plastic, paper, cloth, or another naturally occurring or manmade material. As container 2900 is deployed, film 3796, along with packs 10 placed between the folds of film 3796, exits container 2900. Due to the folds in film 3796, packs 10 are forced from container 2900 in multiple directions.

Figure 38:
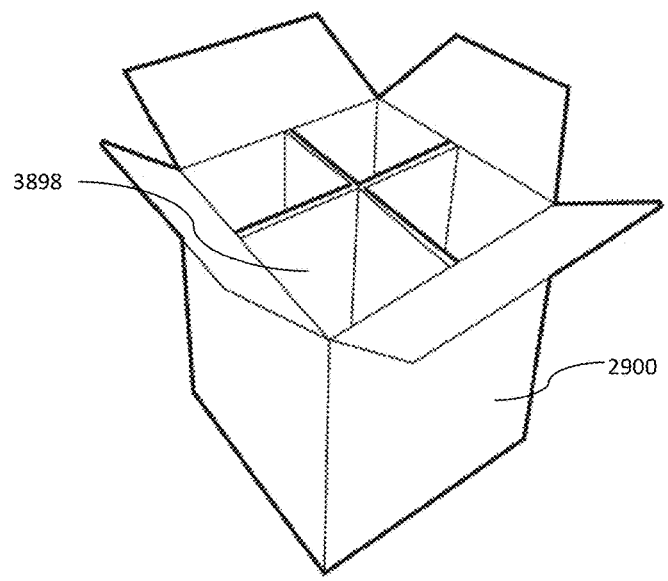
FIG. 38 depicts an embodiment of a container divider.

FIG. 38 depicts an embodiment of another dispersal aid. In the embodiment of FIG. 38, a divider 3893 is placed within container 2900. In the example shown, divider creates four sections within container 2900, however another number of sections can be created by divider 3898. Preferably, divider 3898 is of the same material as container 2900, however another material can be used. Divider 3898 allows packs 10 to be stacked without overlapping. However, in other embodiments, packs 10 can be randomly placed within each section or interleaved. In a preferred embodiment, a deflection device can be installed at the central intersection between the portions of divider 3898 to further disperse packs 10.

Figure 30A:
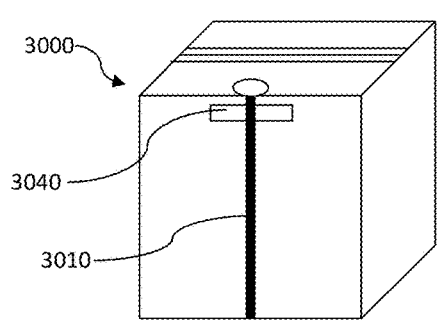
FIGS. 30a-c depicts an embodiment of a storage and deployment container with a canopy.
Figure 30B:
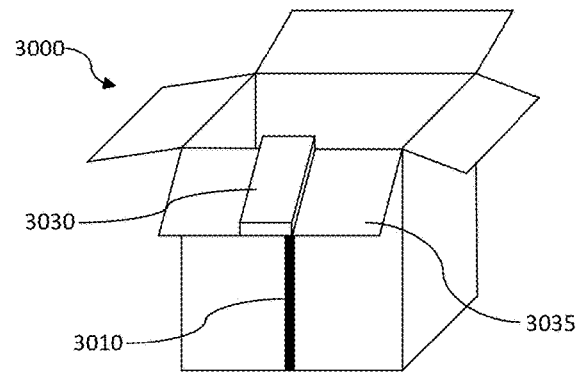
Figure 30C:
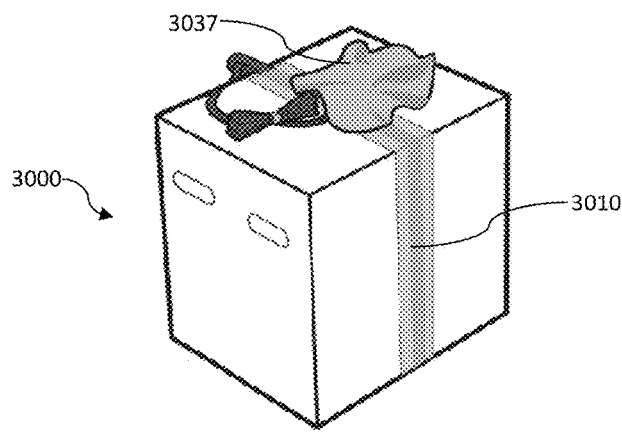

FIGS. 30a-c depict another embodiment of an aerial storage and distribution container 3000. Container 3000 is similar to container 2900, however container 3000 further comprises a canopy 3037. The canopy 3037 is preferably an air resistant device. For example, canopy 3037 can be a parachute, a parasail, a wing, or a rotatable copter. The canopy 3037 is preferably composed of a durable, light weight material. For example canopy 3037 can be made of nylon, cotton, canvas, silk, mylar, rubber, or another naturally occurring or man-made material. Additionally, the canopy 3037 may be repurposable for a secondary use. For example, canopy 3037 may be water proof to use as a shelter, canopy 3037 may have handles to convert to a bag, or canopy 3037 may be reflective to use as a solar powered stove.

The canopy 3037 can be stored within or without container 3000 or can be loose. For example, in the embodiment shown in FIGS. 30a and 30b, canopy 3037 can be stored in a receptacle 3030 coupled to the inside lid flap 3035 of container 3000. Preferably, canopy 3037 is coupled to tether 3010. During deployment of the contents of container 3000, as tether 3010 is pulled, canopy 3037 is preferably released and unfurls in the air due solely to wind resistance. In the embodiment shown in FIGS. 30a and 30b, for example, canopy 3037 is pulled through opening 3040 in container 3000. Container 3000 is then released from the transportation vehicle and canopy 3037, still attached to tether 3010, forces container 3000 to rotate so that the opening is facing toward the earth and, thus, to empty. Additionally, canopy 3037 preferably slows the decent of container 3000 to prevent injury or damage to people or objects on the ground. The canopy 3037 and/or container 3000 can be outfitted with an indication device. The indication device can alert people on the ground of the falling container and can direct people to the container 3000 once on the ground. The indication device, for example, can be a light, smoke, a noise maker (e.g. whistle), a GPS indicator, or a reflective surface.

Figure 31A:
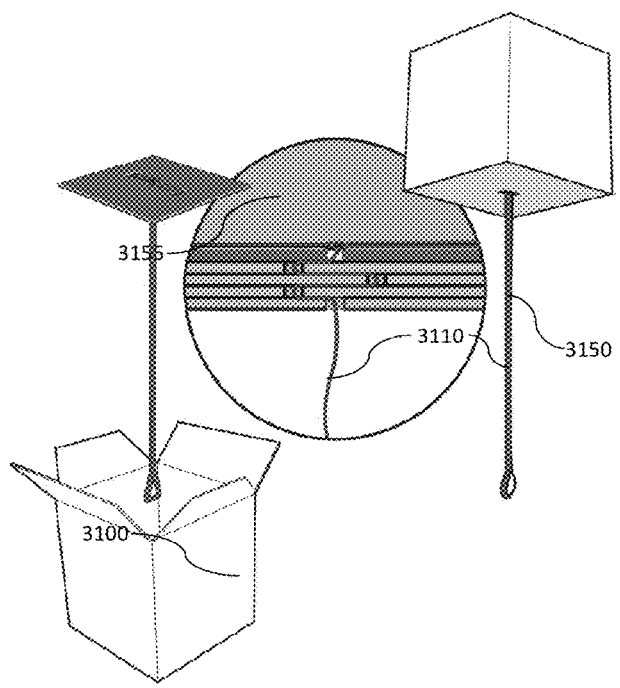
FIGS. 31a-d depict an embodiment of a storage and deployment container with a staggered slot in the bottom surface.
Figures 31B, 31C, 31D:
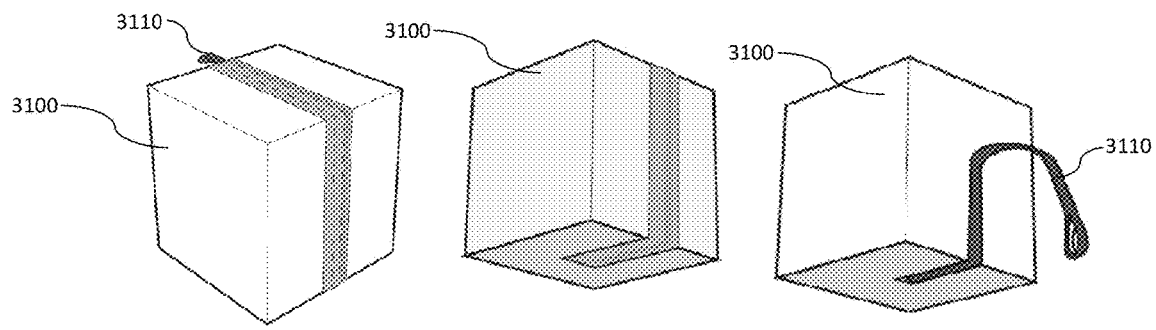

FIGS. 31a-d depict another embodiment of an aerial storage and distribution container 3100. Container 3100 is similar to container 2900, except the bottom of container 3100 has a staggered slot 3150. Staggered slot 3150 preferably forces tether 3110 to weave through several layers of the bottom of container 3100. As shown in FIG. 31a, tether 3110 weaves through staggered slot 3150, making three turns. While three turns are shown, another number of turns can be implemented. Preferably, tether 3110 is coupled to a board 3155 that fits within the bottom of container 3100. Board 3155 can be masonite, plywood, metal, plastic, cardboard, or another material. Tether 3110 can be coupled to board 3155 by friction, a slip knot, rivets, bolts, brads, adhesive, screws, or another fastening device.

Staggered slot 3150 aids in sealing the bottom of container 3100 and preferably reduces the forces experienced by container 3100 as it is deployed. Preferably, during deployment of container 3100, the material of container 3100 rips as tether 3110 straightens, thereby slowing the tautening of tether 3110 and reducing the pressure on board 3155.

As shown in FIG. 31 b-d, tether 3110 preferably exits the bottom of container 3100, and is secured to one side and the top of container 3100. Preferably, tether 3110 is secured to container 3100 by paper tape, however other fastening devices can be used (e.g. adhesive, bolts, rivets, brads, screws, nails, twine, rope or another fastening device. Preferably, tether 3100 covers and seals the seam between the two portions of the lid of container 3100. As container 3100 is deployed, preferably, the seam between the two portion of the lid of container 3100 becomes unsealed, thereby allowing the contents of container 3100 to exit container 3100.

Figure 32A:
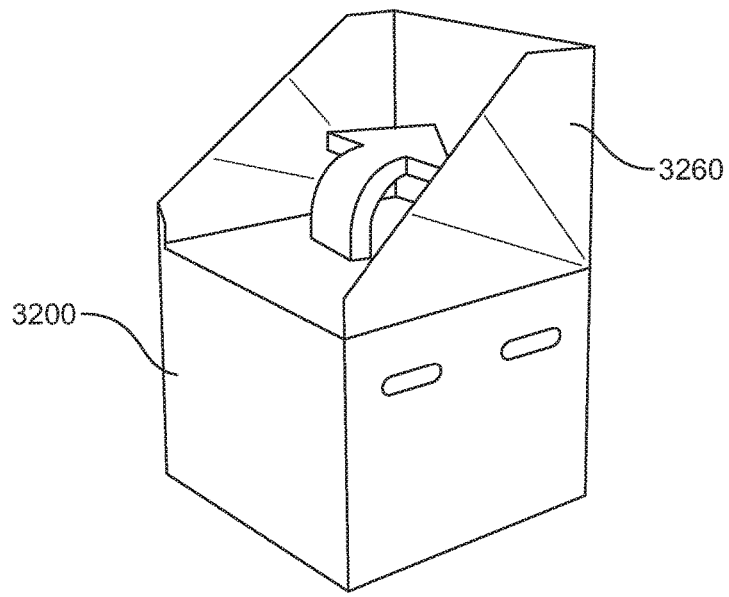
FIG. 32a-b depict an embodiment of a storage and deployment container where the upper surface opens into a chute.
Figure 32B:
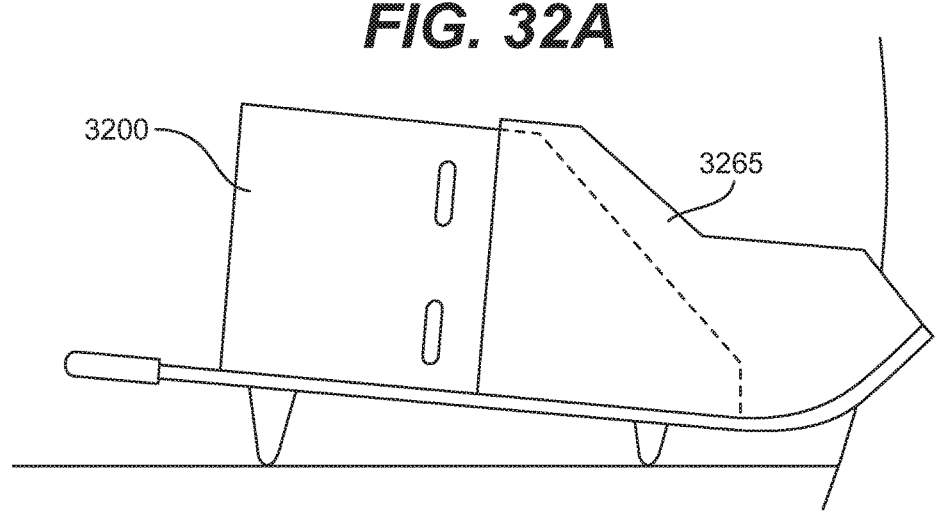

FIGS. 32 a-b depict another embodiment of a container 3200. The top of container 3200 preferably unfold to form a chute 3260 through which the contents of container 3200 can be dispersed from a vehicle. Container 3200 may be able to be coupled to a tipping pallet 3265 to assist in directing the contents of container 3200 out of the vehicle.

FIGS. 43a-f depict another embodiment of a container 4300. In the embodiment of FIGS. 43a-f, the container is preferably comprised of a single piece of corrugated plastic, cut and folded into a closable box. Preferably both the top and bottom of container 4300 are sealable without the use of a sealing device (e.g. tape, fasteners, or twine). In the preferred embodiment, container 4300 has at least one tab extending from the top of the box and at least one indentation or hole in the bottom of the box to allow multiple boxes to be stacked on top of each other. Preferably, the seams of container 4300 are heat sealed.

FIGS. 39*a-c* depict an embodiment of a container bag 3900. Bag 3900 preferably is collapsible for shipping as depicted in FIG. 39*a*. At the opening of bag 3900, preferably there is a main ring 3944. Main ring 3944 preferably has an angled flange on the inner diameter (as shown in FIG. 39*c*). The angled flange preferably disrupts flight path of the contents of bag 3900 during deployment, causing the contents to scatter. Main ring 3944 is held onto bag 3900 by bag retainer ring segments 3946. While two bag retainer ring segments are shown another number can be used (e.g. one ring, three ring segments, or four ring segments). Preferably, the open edge of bag 3900 is held between main ring 3944 and bag retainer ring segments 3946. In the preferred embodiment pack disrupter disk 3948 is coupled to main ring 3944 by straps 3942. While four straps 3942 are shown another of straps 3942 can couple pack disrupter disk 3948 to main ring 3944. Preferably, during transit, pack disrupter disk 3948 acts as a lid for bag 3900. However, once deployed, pack disrupter disk 3948 is held at a distance from main ring 3944 by straps 3942. Pack disrupter disk 3948 further disrupts flight path of the contents of bag 3900 during deployment, causing the contents to further scatter.

In some embodiments, other containers or magazines holding a desired number of the packs 10 are disposed in a cargo hold of an airplane, such as a C-130, for example. Any suitable method for loading the packs 10 onto the airplane may be employed. For example, the containers may be loaded on the airplane using the system and method described in U.S. Pat. App. Pub. No. 2008/0219830 entitled "Channel Slide Cargo Handling System and Method," hereby incorporated herein by reference in its entirety. The containers may be disposed in rows and columns as is customary for the cargo of airplanes. The containers may include desired quantities of packs 10 and types of supplies, and may be prepared and stored at strategic locations across the U.S. and the world awaiting distribution in the event of a military operation or natural disaster.

In a preferred embodiment, the containers are placed into a larger bulk (or gaylord) box for storage, shipment, and deployment. The bulk box can be made of wood, cardboard, plastic, corrugated plastic, metal, or another ridged or flexable material FIGS. 40*a-c* depict one embodiment of a gaylord box 4000. Preferably, box 4000 houses eight containers as described herein, however box 4000 can house another number of containers (e.g. 4, 6, or 10). In the preferred embodiment, box 4000 is reinforced with frame 4010. Frame 4010 can be made of wood, cardboard, plastic, metal, or another ridged material. Preferably, frame 4010 is coupled to box 4000 via tethers 4020. In the preferred embodiment, tethers 4020 are tied or otherwise attached to frame 4010 and pass through an opening in the bottom of box 4000. Tethers 4020 can then be coupled to the deployment vehicle (e.g. airplane) or to a canopy. During deployment, box 4000 is jettisoned from the deployment vehicle and is forced upside down, either by the canopy or by the tethers being attached to the deployment vehicle. Once upside down, the smaller containers exit box 4000 and empty their contents by one of the methods described herein.

Figure 45:
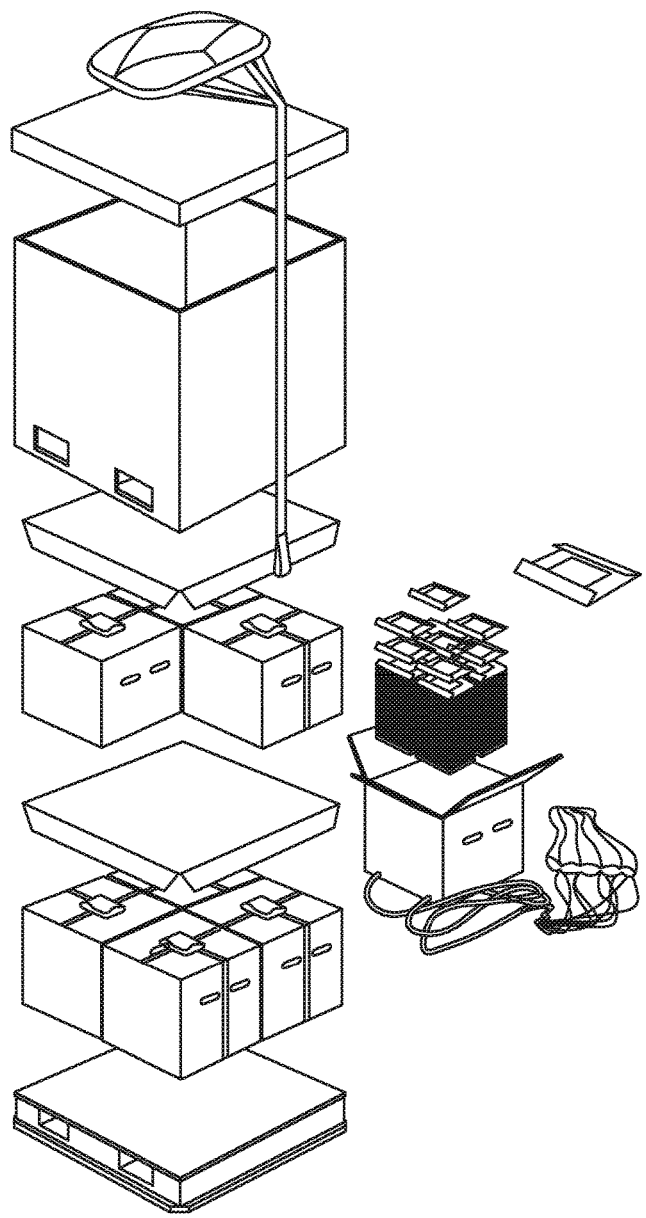
FIG. 45 depicts an embodiment of an exploded view of a loaded gaylord box.
Figure 46:
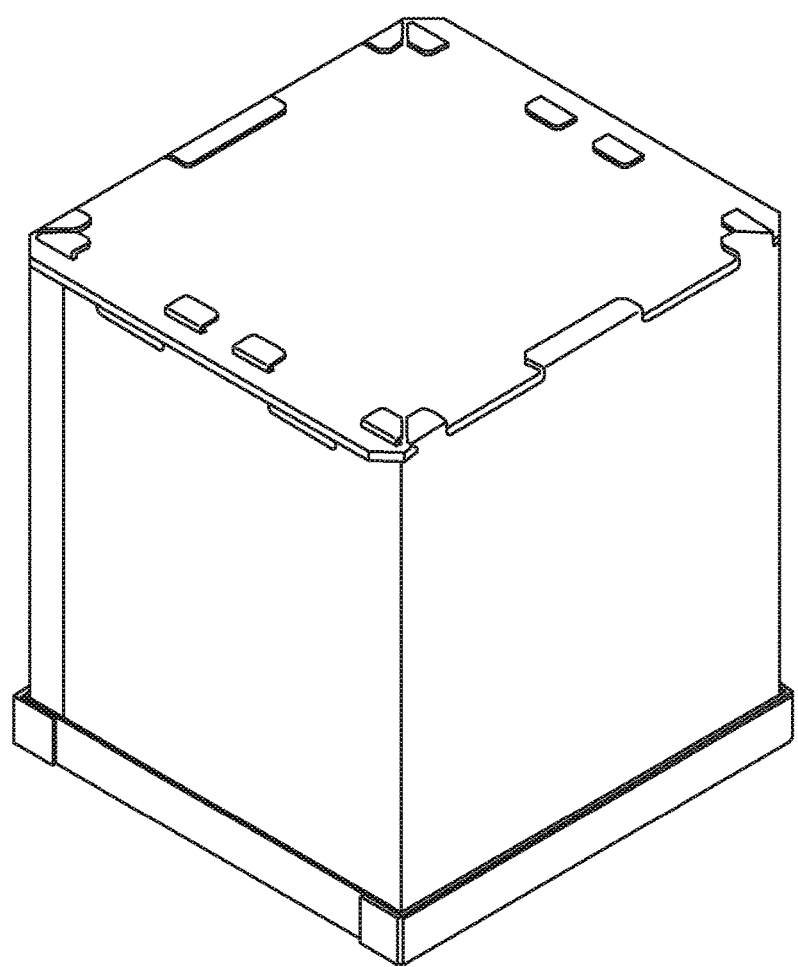
FIG. 46 depicts the underside of an embodiment of a gaylord box coupled to a pallet.

FIG. 41 depicts another embodiment of a gaylord box 4100. Box 4100 is similar to box 4000, however instead of a frame, the bottom surface of box 4100 is defined by a pallet 4130. Pallet 4130 can be made of cardboard, wood, plastic, metal, or another ridged material. Preferably, both box 4100, which fits over pallet 4130 or is sealable to the pallet, and pallet 4130 have openings for a forklift to engage for ease of loading onto the deployment vehicle. Box 4100 and pallet 4130 can be sealed together via folding the material of box 4100 into pallet 4130, welding, rivets, bolts, adhesive, or other fastening devices. FIG. 46 depicts an embodiment of a gaylord box coupled to a pallet with portions of the gaylord box inserted into the bottom surface of the pallet and then folded over. Preferable, pallet 4130 and box 4100 are both loaded onto the deployment vehicle and are both jettisoned from the deployment vehicle at the location of deployment. FIG. 45 depicts an exploded view of an embodiment of a loaded gaylord box coupled to a pallet.

Figure 44A:
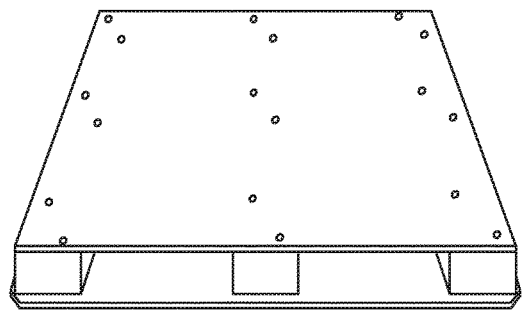
FIGS. 44a-b depict an embodiment of a pallet.
Figure 44B:
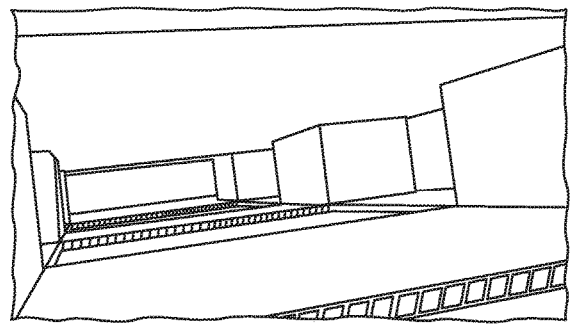

FIGS. 44*a-b* depict another embodiment of a pallet 4400. In the embodiment shown in FIGS. 44*a-b*, the pallet is comprised of a corrugated plastic top and bottom and foam supports. Preferably, the foam supports prevent dipping or sagging of the top while loaded. The material of the pallet 4400 provides durability, is light weight, and elastic compared to traditional wood pallets. Pallet 4400 may be sealable to a gaylord box made of corrugated plastic, and once sealed, the pallet and gaylord box may be water tight. Pallet 4400 may be otherwise coupleable to a gaylord box such that the pallet and gaylord box do not separate during deployment. Preferably, the bottom of pallet 4400 is proud of the rest of pallet 4400 providing a flange that can mate with an aircraft container delivery system (CDS). Preferably, the flange allows the pallet to be used as a skid board. To increase the strength of the skid board, preferably two sheets of superimposed corrugated plastic are coupled together orthogonally to create the bottom of pallet 4400.

Figure 42:
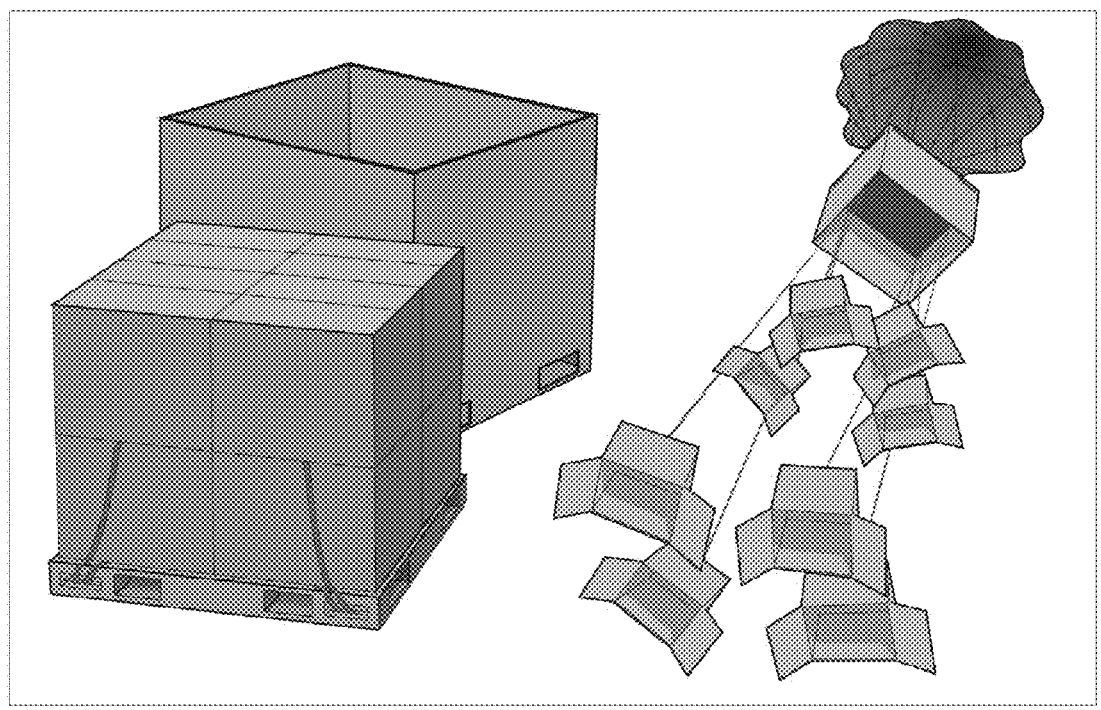
FIG. 42 depicts an embodiment of a deployment system.
Figure 43A:
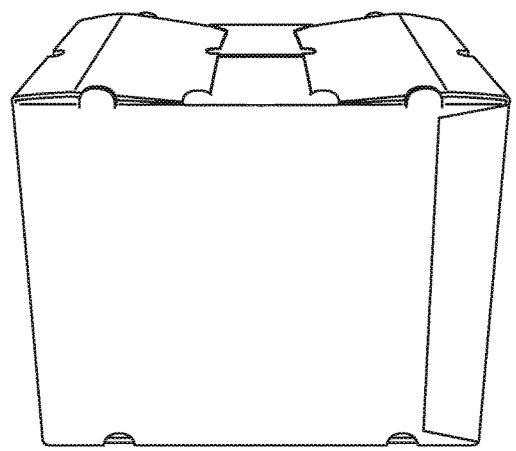
FIGS. 43a-f depict another embodiment of a storage and deployment container.
Figure 43B:
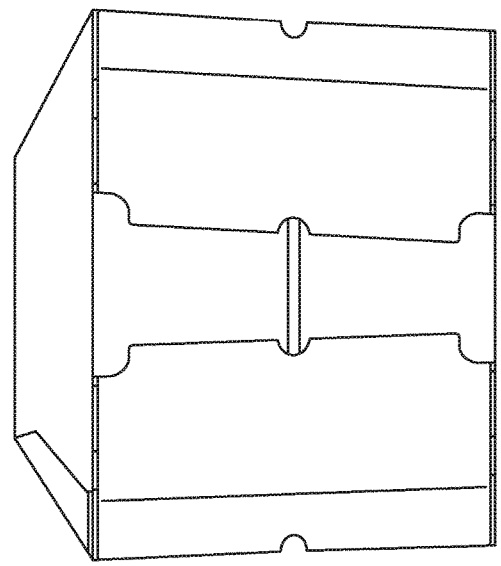
Figure 43C:
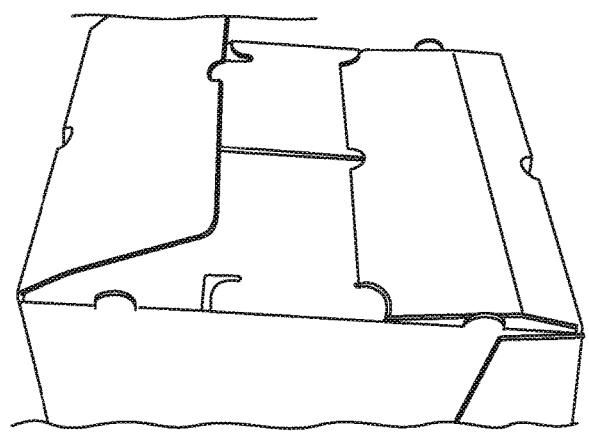
Figure 43D:
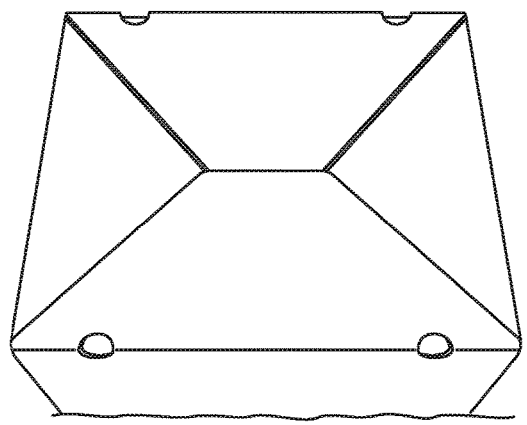
Figure 43E:
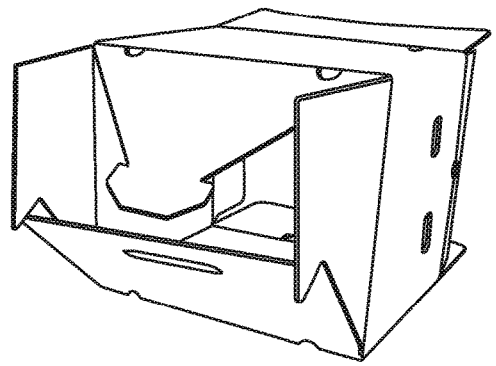
Figure 43F:
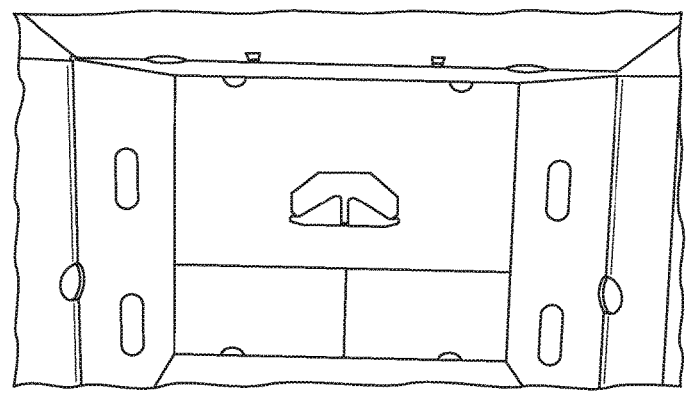
Figure 47:
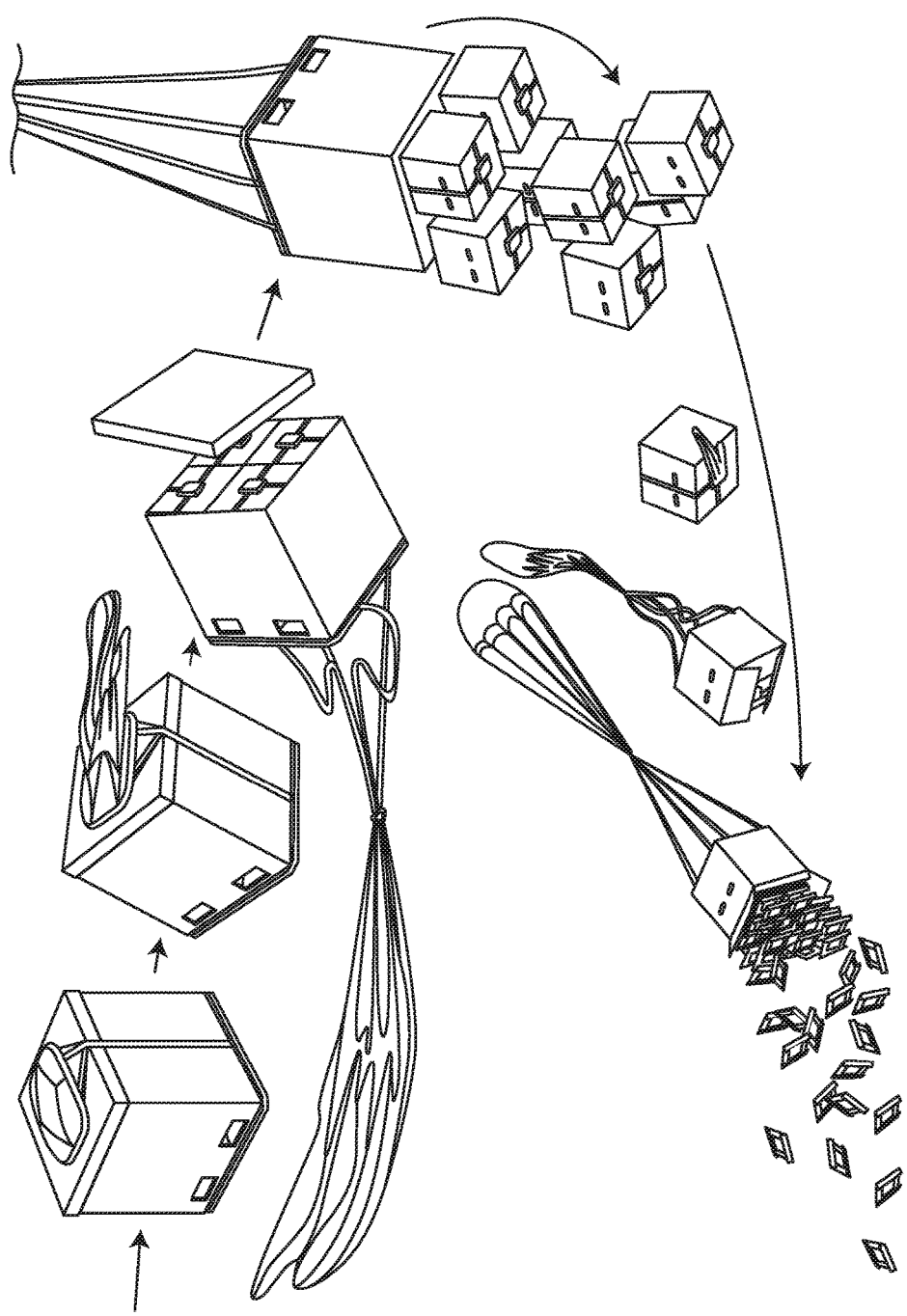
FIG. 47 depicts an embodiment of the progress of the gaylord box after deployment.

During deployment, box 4000 or box 4100 is jettisoned from the deployment vehicle and is forced upside down, either by the canopy or by the tethers being attached to the deployment vehicle. Once upside down, the smaller containers exit the box and empty their contents by one of the methods described herein. For example, as depicted in FIG. 42, the smaller containers may be tethered to the box 4000 or to the pallet of box 4100 and, once the contents of the smaller containers is deployed, the smaller containers and the box 4000 or box 4100 can descend together with the single canopy coupled to the box 4000 or box 4100 slowing the decent. FIG. 47 depicts another embodiment of the progress of the containers after deployment. In the embodiment depicted in FIG. 47, each smaller container has its own canopy, which allows the containers to drift apart during deployment.

In an exemplary embodiment, a rear hatch of the airplane is closed during transport of the containers to a desired location, and a conveyor system disposed underneath the containers is retracted. Once the airplane has reached a desired location, the rear hatch of the airplane is opened and the conveyor system is extended from the cargo hold. The packs 10 in the containers are then emptied onto the conveyor system, and the conveyor system causes the packs 10 to exit the airplane from the rear hatch for aerial distribution to people on the ground. It is understood that the packs 10 of a container may be emptied en masse, or the packs 10 may be individually metered onto the conveyor system at a desired rate. The packs 10 are conveyed from the containers and out of the airplane so that the packs 10 are not bunched or clustered together, and that separation of each pack 10 from the other packs 10 is achieved.

Figure 33:
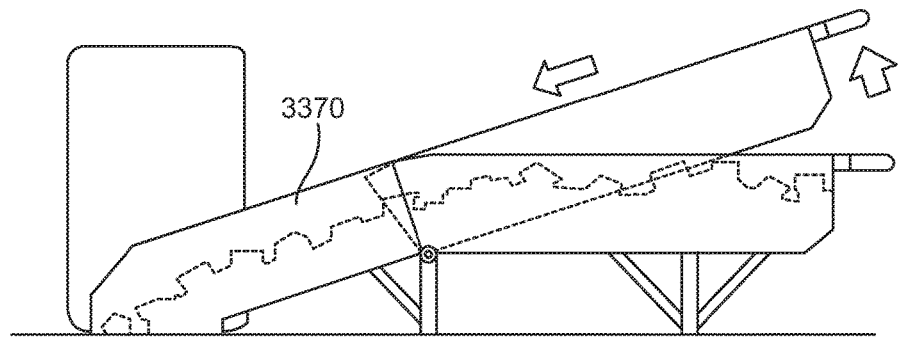
FIG. 33 depicts an embodiment of a deployment hopper.

In another embodiment, as depicted in FIG. 33, the deployment vehicle can be outfitted with a hopper 3370. Hopper 3370 is preferably coupled to one side of the vehicle and can be filled with packs 10 for deployment at the desired location. Once the vehicle reached the location of deployment, at least a portion of hopper 3370 can be lifted to allow gravity to force packs 10 from the vehicle. In another embodiment a mechanical conveyor forces packs 10 from the vehicle. Hopper 3370 can be metal, plastic, wood, or other naturally occurring or manmade materials. If the vehicle is an airplane, the weight of the hopper and its contents may have to be balanced.

Figure 34A:
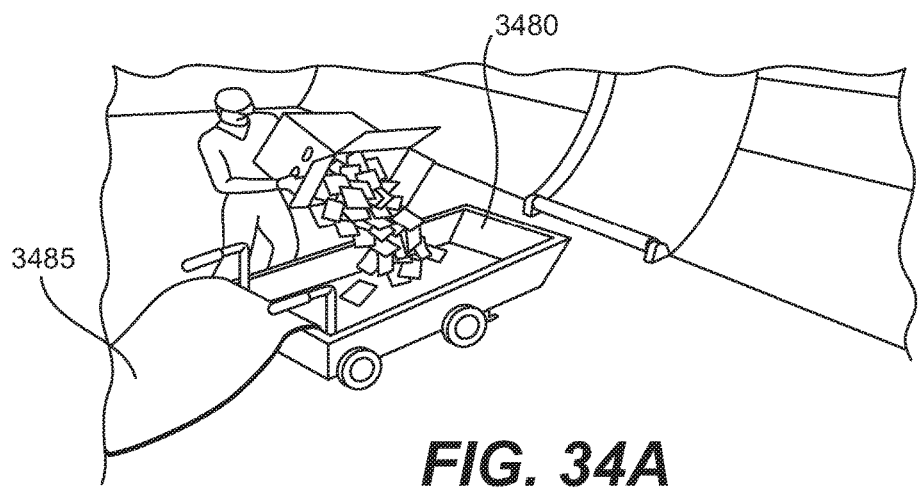
FIGS. 34a-c depict an embodiment of a deployment cart.
Figure 34B:
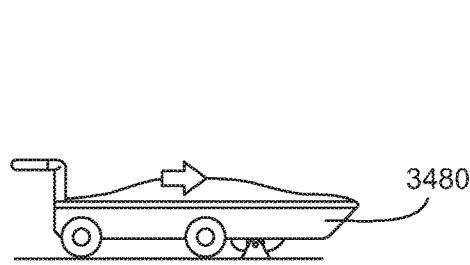
Figure 34C:
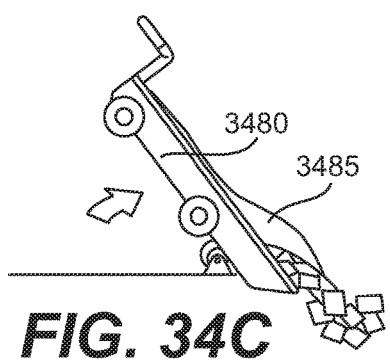

In another embodiment, as depicted in FIGS. 34 *a-c*, a cart 3480 can be used to deploy the packs 10 from the vehicle. Cart 3480 may be similar to a wheelbarrow with one wheel or may have multiple wheels. In the preferred embodiment, cart 3480 is loaded with packs 10 and at the location of deployment is tipped out of the vehicle so that packs 10 exit cart 3480. Cart 3480 may be outfitted with a tarp 3485 or other covering to prevent packs 10 from blowing back into the vehicle. Furthermore, cart 3480 may have hooks coupled to the bottom surface that engage a roller mounted to the exit of the vehicle. The hooks and roller may assist in tipping cart 3480. Cart 3480 and tarp 3485 can be metal, plastic, wood, or other naturally occurring or manmade materials.

It has also been surprisingly discovered that when a plurality of packs 10, as shown in FIGS. 1-10, are distributed from an elevated point above the ground such as from an airplane, substantially all of the packs 10 are oriented with the aerodynamic component 32, 34 between the sheet 18 and the ground. Such orientation results in the aerodynamic component 32, 34 being caught by the air and extending outwardly to minimize a terminal velocity of the packs 10. The orientation of the aerodynamic component 32, 34 further advantageously results in a random and even distribution of the packs 10 across the ground above which the packs 10 are deployed.

Due to the size of the packs 10, the proportions of the contents of the of the inner package 12 thereof, and the materials from which the packs 10 are formed, the packs 10 are adapted to reach a desired peak terminal velocity that is sufficiently low such that the pack 10 does not harm people or property on the ground. As discussed herein, the size, weight, and nature of the contents of the packs 10 will dictate the materials used to form the inner and outer packages 12, 14 and the size of the pack 10.

The aerodynamic component 32, 34 of the packs 10 advantageously provide a wind resistant structure that further minimizes the terminal velocity thereof. The rigid inserts 40 optionally incorporated into the pack 10 provide rigidity to militate against the bending or folding of the pack 10 during the aerial distribution. By militating against bending or folding, the surface area of the pack 10 contacted by air is maximized, thereby reducing, and in some instances minimizing, the terminal velocity of the pack 10.

By distributing the packs 10 individually rather than on pallets, a wider distribution of supplies contained therein may optionally be achieved, and hoarding of the supplies is more difficult, thereby ensuring more people receive the necessary supplies.

As shown in FIGS. 11-17, the present disclosure also includes a continuous system 100 for producing a pack 10. Other types of packs 10 may also be manufactured with the system 100 of the present disclosure.

Figure 11:
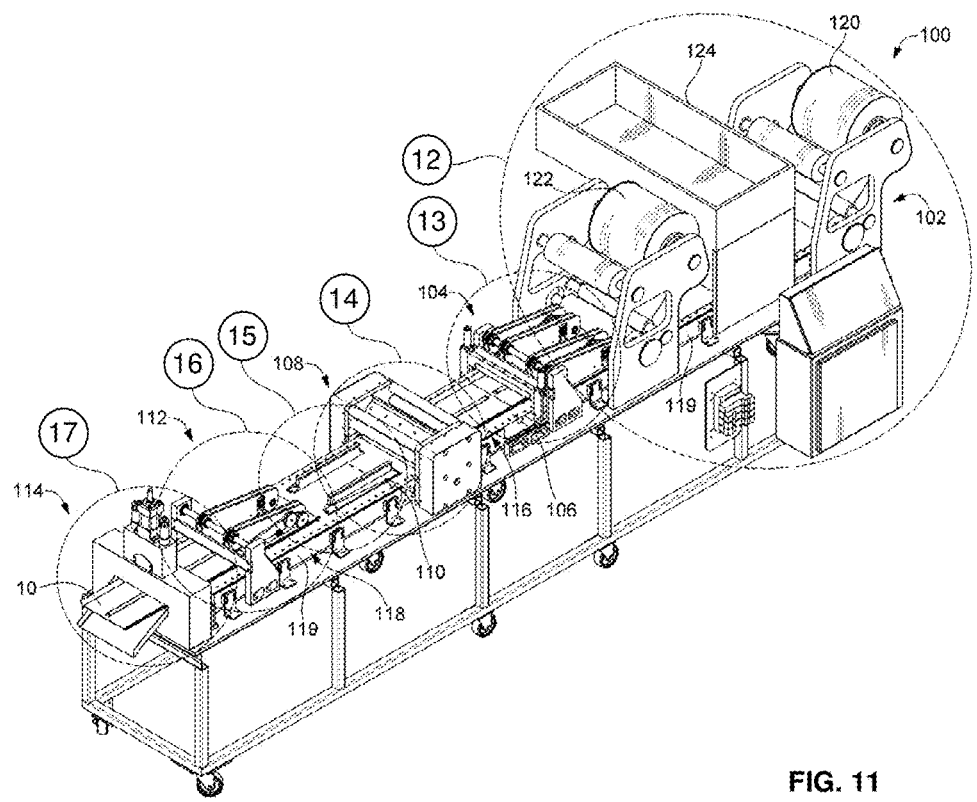
FIG. 11 is a side perspective view of a system for producing an emergency pack.

Referring to FIG. 11, the system 100 for manufacturing the pack 10 includes a product loading unit 102, a longitudinal mid-pack and edge sealing unit 104, a transverse heat sealing unit 106, a perforator unit 108, a wing folding unit 110, a wing band sealing unit 112, and a pack separator unit 114. The system 100 also includes a pair of longitudinally extending conveyors 116, 118 disposed in sequence, hereinafter referred to as the first conveyor 116 and the second conveyor 118, for continuously transporting the pack 10 and related subcomponents of the pack 10 through the system 100. Each of the first conveyor 116 and the second conveyor 118 may be in communication with at least one vacuum plenum 119 configured to secure the pack 10 and the related subcomponents of the pack 10 to the first conveyor 116 and second conveyor 118 as the pack 10 is manufactured.

Figure 12:
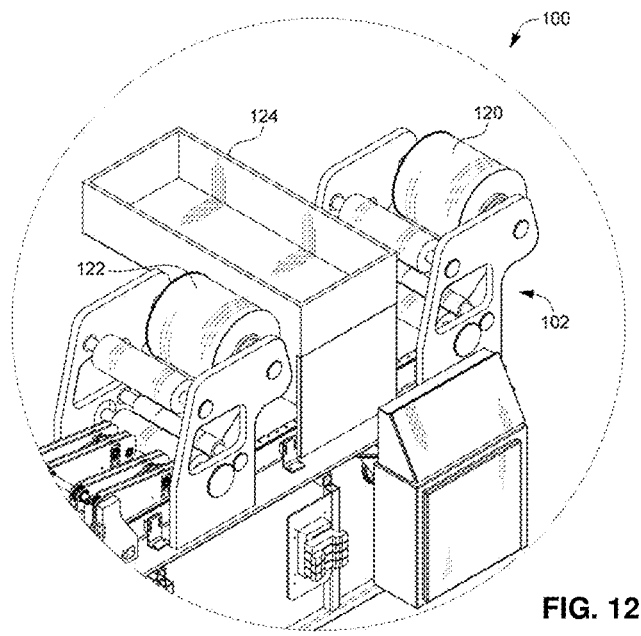
FIG. 12 is an enlarged fragmentary side perspective view of the system identified by callout 12 in FIG. 11, further showing a product loading unit of the system.

With reference to FIG. 12, the product loading unit 102 is configured to deposit an inner package including an item for aerial delivery between a first sheet and a second sheet. The product loading unit 102 may include a first sheet supply roll 120, a second sheet supply roll 122, and a product loader 124. The first sheet supply roll 120 provides the first sheet, the second sheet supply roll 122 provides the second sheet, and the product loader 124 provides the inner package for the pack 10. The first sheet supply roll 120 continuously provides the material forming the first sheet for the pack 10. As the first sheet is advanced from the first sheet supply roll 120, a printer may print desired indicia thereon. For example, the printer may be used to print a date of creation, date of expiration, tracking information and indicia, and the like. The first sheet may be advanced through the system 100 by the first conveyor 116. One of ordinary skill should understand that the first sheet may be advanced through the system 100 by alternative means, such as pairs of cooperating driven rollers, as desired. Additionally, the first sheet may be comprised of multiple layers as described herein.

As the first sheet is advanced adjacent the product loader 124, the inner packages are deposited on the first sheet by the product loader 124 at desired intervals. Positive results have been obtained from packs 10 having the inner packages disposed along a substantially central longitudinally extending axis of the first sheet. The inner packages in the product loader 124 may contain the same supplies, or the inner packages may contain different supplies, as desired. For example, a quantity of water-containing inner packages may be supplied to the first sheet on the first conveyor 116, or the inner packages may alternately contain water, food, and personal hygiene supplies, for example. In certain embodiments, the packs may be empty and filled at a later time or place.

The second sheet supply roll 122 continuously provides the material forming the second sheet for the pack 10. The second sheet may be distributed from the second sheet supply roll 122 by a pair of overwrap rolls and over the inner package and the first sheet, for example. Other suitable means for distributing the second sheet over the inner package and the first sheet may also be employed, as desired. The second sheet may be identical to the first sheet or may be different from the first sheet.

Figure 13:
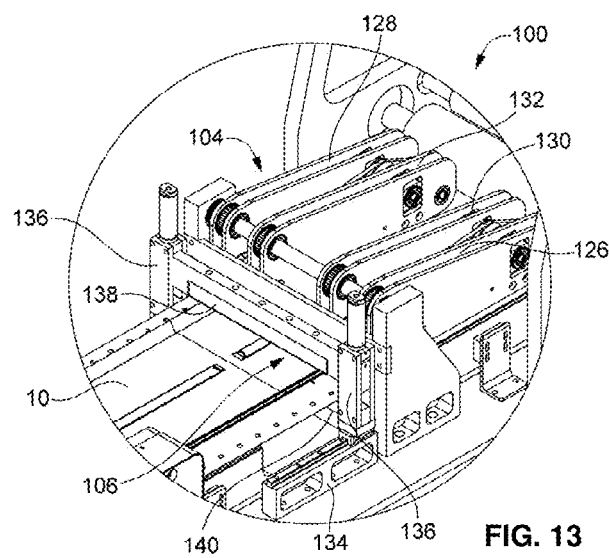
FIG. 13 is an enlarged fragmentary side perspective view of the system identified by callout 13 in FIG. 11, further showing a longitudinal mid-pack and edge sealing unit and a transverse heat seal unit of the system.

After the inner package has been disposed between the first and second sheets, the assembly including the inner package and the first and second sheets is advanced to the longitudinal mid-pack and edge sealing unit 104, for example, as illustrated in FIG. 13. The longitudinal mid-pack and edge sealing unit 104 seals the first sheet and the second sheet to form an outer package housing the inner package. The longitudinal mid-pack and edge sealing unit 104 may be a heat sealer, for example, although other means for sealing the inner package between the first and second sheets may also be employed within the scope of the disclosure.

In a particular embodiment, the longitudinal mid-pack and edge sealing unit 104 heat seals both side edges of the first and second sheets and mid-pack locations of the first and second sheets adjacent the inner package. As a nonlimiting example, the longitudinal mid-pack and edge sealing unit 104 may include a pair of side sealing bands 126, 128 configured to heat seal the side edges of the first and second sheets. The longitudinal mid-pack and edge sealing unit 104 may also include a pair of mid-pack sealing bands 130, 132 configured to heat seal the mid-pack areas of the first and second sheets adjacent the inner package.

As shown in FIG. 13, the transverse heat sealing unit 106 of the system 100 is disposed adjacent the longitudinal mid-pack and edge sealing unit 104. At the transverse heat sealing unit 106, top edges and bottom edges of each of the first and second sheets of the unsealed pack 10 are sealed. The transverse heat sealing unit 106 includes a pair of linear rail mount blocks 134 on which a pair of heat seal cylinders 136 are movably mounted. The linear rail mount blocks 134 may include bearings, for example, and be biased, for example, with a spring or the like, to return to a first location proximal the longitudinal mid-pack and edge sealing unit 104 after being moved to a second location by the first conveyor 116. The heat seal cylinders 136 selectively actuate an upper heat seal bar 138 and a lower heat seal bar 140.

The partially sealed pack 10 is advanced to the transverse heat sealing unit 106, for example, by the first conveyor 116. The top edges of the of the first and second sheets are first sealed by an actuation of the upper and lower heat seal bars 138, 140 by the heat seal cylinders 136, which causes the upper and lower heat seal bars 138, 140 to compress and heat the first and second sheets therebetween at the first location. The heat seal cylinders 136 and the upper and lower heat seal bars 138, 140 advance with the unsealed pack 10 via coupling the first conveyers, which moves via a positive coupling with the first conveyor, along the linear rail mount blocks 134. After a predetermined period of time, which time is sufficient to cause the top edges of the first and second sheets to be sealed, the heat seal cylinders 136 cause the upper and lower heat seal bars 138, 140 to lift from the first and second sheets. The upper and lower heat seal bars 138, 140 are lifted from the first and second sheets at the second location. The upper and lower heat seal bars 138, 140 are then returned to the first location, and the process repeated in order to seal the bottom edges of the first and second sheets. It is understood that the steps that generate the longitudinal mid-pack and edge seals and the top and bottom edge seals may occur in a reverse order to that presently described, or may occur substantially simultaneously, as desired. In certain embodiments, at least one edge is left unsealed so that the pack can be filled at a later time or place, after which the remaining edges are sealed.

The transverse heat sealing unit 106 may also be employed to secure a top edge and a bottom edge of the at least one inner package between the first sheet and the second sheet with a top transverse seal and a bottom transverse seal. For example, the upper heat seal bar 138 and the lower heat seal bar 140 may have raised portions that create each of the top and bottom transverse seals and the top and bottom edge seals. Other means for forming the top and bottom transverse seals, to couple the inner package with the outer package, may also be used within the scope of the present disclosure.

Once the longitudinal mid-pack and edge seals and the transverse top and bottom edge seals are formed, each pack 10 is caused to move past the heat transverse heat sealing unit 106 by the first conveyor 116 to a perforator unit 108. The perforator unit 108 is disposed between the transverse heat sealing unit 106 and the wing folding unit 110. The perforator unit 108 transversely perforates the first and second sheets of the each pack 10 to facilitate separation of the individual packs 10. Additionally, the perforator unit 108 forms a perforation to facilitate an opening of the pack 10.

Figure 14:
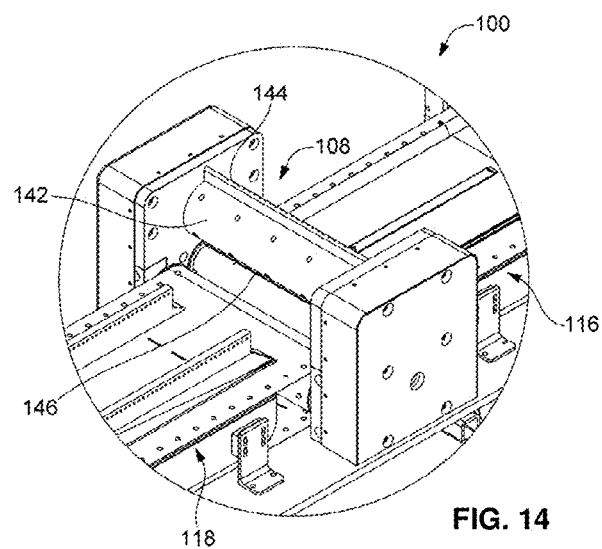
FIG. 14 is an enlarged fragmentary side perspective view of the system identified by callout 14 in FIG. 11, further showing a perforator unit of the system with an outer cover removed to show a perforating roller and an anvil roller of the perforator unit.

In a particular embodiment shown in FIG. 14, the perforator unit 108 includes a perforation roller 142 with at least one perforation blade 144. The perforation roller 142 is disposed opposite an anvil roller 146. It should be appreciated that the first conveyor 116 ends adjacent one side of the perforator unit 108, the second conveyor 118 begins adjacent the other side of the perforator unit 108, and the perforation roller 142 and anvil roller 146 are disposed between the first conveyor 116 and the second conveyor 118. The perforation blade 144 of the perforation roller 142 cooperates with the anvil roller to perforate the packs 10 as they pass therebetween. The perforation blade 144 may have a linear portion for perforating a width of the emergency packs for separation thereof, and an angular portion for formation of a perforated opening for the packs 10. The angular portion may be substantially V-shaped, for example. The perforation blade 144 may have other shapes, as desired. Other means for perforating the packs 10 may also be employed within the scope of the present disclosure.

Figure 15:
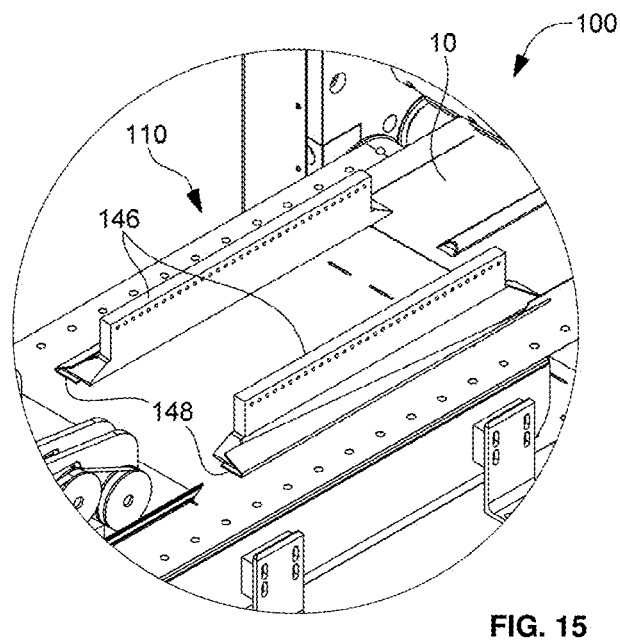
FIG. 15 is an enlarged fragmentary side perspective view of the system identified by callout 15 in FIG. 11, further showing a wing folding unit of the system, an emergency pack removed from the wing folding unit to show a guide plate of the wing folding unit.
Figure 16:
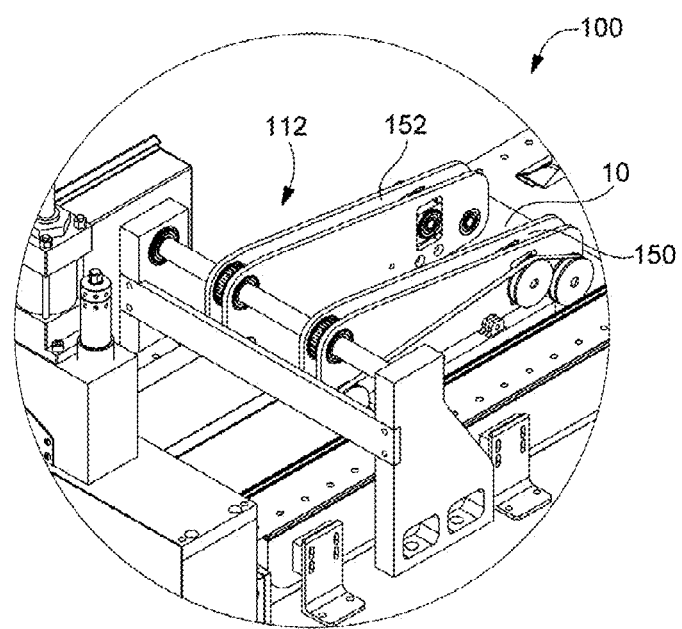
FIG. 16 is an enlarged fragmentary side perspective view of the system identified by callout 16 in FIG. 11, further showing a wing band sealing unit of the system.

Referring now to FIGS. 15 and 16, the present system 100 further includes a wing folding unit 110 and a wing band sealing unit 112. The wing folding unit 110 and the wing band sealing unit 112 are configured to form a pair of aerodynamic elements such as wings on the outer package adjacent the at least one inner package. The aerodynamic elements preferably cause turbulent flow across the outer package and reduce or minimize a descent rate of the pack 10 in operation, as the pack 10 is falling through the air. The aerodynamic elements also may contribute to reducing or minimizing a descent rate of the pack 10 in operation, as the pack 10 is falling through the air.

As the perforated packs 10 are advanced by the second conveyor 118, the wing folding unit 110 folds a portion of the side edges of the packs 10. For example, the wing folding unit 110 includes a pair of spaced apart folder bases 146 and a pair of folder guide plates 148 disposed adjacent the spaced apart folder bases 146. The side edges of the packs 10 are advanced through the folder guide plates 148, which fold each side edge to form the drag elements of the packs 10.

Following the folding of the side edges of the packs 10, the folded side edges are heat sealed with the wing band sealing unit 112, for example, as shown in FIG. 16. Like the longitudinal mid-pack and edge sealing unit 104 and the transverse heat sealing unit 106 of the system 100, described hereinabove, the wing band sealing unit 112 is employed to seal the first and second sheets of the packs 10. In particular, the wing band sealing unit 112 may include a pair of heated sealing bands 150, 152 that compress and heat the folded edges to form wing seals. The wing band sealing unit 112 simultaneously forms the drag elements and side sealing edges of the packs 10. It should be understood that the aerodynamic elements or "wings" of the packs 10 are closed as formed, but open in operation, as the pack 10 is falling through the air.

In another embodiment of the present disclosure, rigid inserts may be disposed adjacent the side edges of the first and second sheets prior to heat sealing by the wing band sealing unit 112. The rigid inserts may be heat sealed into the aerodynamic elements or adjacent the sealing edges between the side edge seals and the mid-pack seals, as desired.

Figure 17:
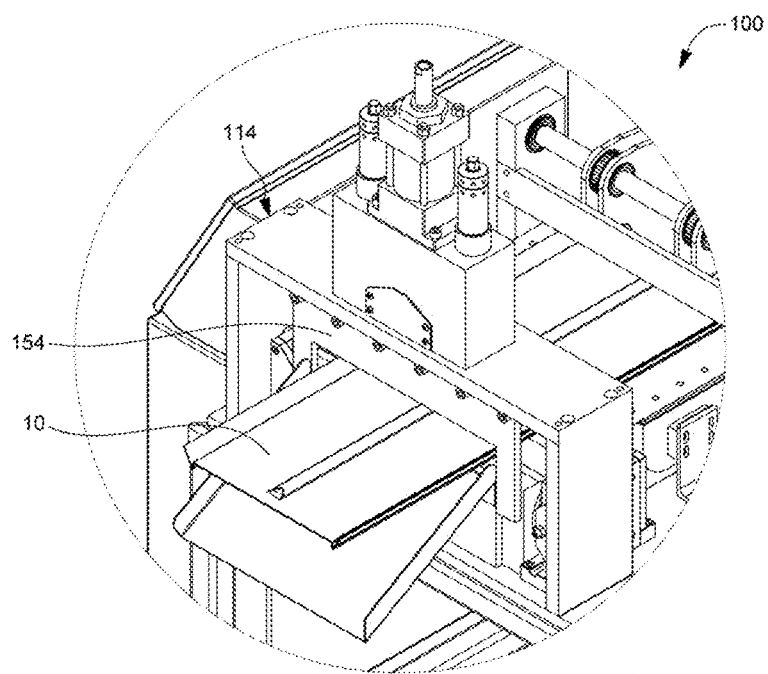
FIG. 17 is an enlarged fragmentary side perspective view of the system identified by callout 17 in FIG. 11, further showing a package separator unit of the system with an outer cover removed to show a guillotine of the package separator unit.

With reference to FIG. 17, the system 100 further may include a package separator unit 114. The package separator unit 114 is disposed adjacent the wing band sealing unit 112, for example. The package separator unit 114 may include a guillotine 154. The guillotine 154 is configured to cut along at least a portion of the perforation formed by the perforator unit 108 and thereby separates each pack 10. The guillotine 154 thereby forms individual ones of the pack 10. As the packs 10 exit the system 100, the packs 10 are collected and stored for transport and distribution. The packs 10 may be collected in a container with no organization to the packs 10. Alternatively, the packs 10 may be collected in an organized manner resulting in stacked packs 10. For example, the container may be a pack magazine containing a desired number of packs 10 stacked with the inner package of pack 10 offset from the inner package of adjacent packs 10. Other means for collecting the individual packs 10 may be employed, as desired.

In another embodiment, the individual packs 10 are not separated by the package separator unit 114, to provide a linear "string" of packs that are separated during deployment.

The present disclosure further includes a method for manufacturing the pack 10. The method may be used with the system 100 of the present disclosure, or another system, as desired. The method first includes the step of providing the first sheet and the at least one inner package including the item for aerial delivery. The inner package is then deposited on the first sheet. A second sheet is disposed over the inner package and the first sheet. The first sheet and the second sheet are then sealed to form the outer package housing the inner package. The at least one aerodynamic element is formed on the outer package, for example, adjacent the at least one inner package. The aerodynamic element preferably causes turbulent flow across the outer package and reduces or minimizes the descent rate of the pack in operation. The aerodynamic element may also reduces or minimizes the descent rate of the pack in operation.

The step of sealing the first sheet and the second sheet may include forming a top edge seal, a bottom edge seal, and spaced apart side edge seals on the first sheet and the second sheet. The step of sealing the first sheet and the second sheet may also include forming a pair of mid-pack seals. The inner package is confined within the outer package by the pair of mid-pack seals, the top edge seal, and the bottom edge seal.

The step of forming the at least one aerodynamic element may include folding corresponding side edges of the first sheet and the second sheet. The folded edges are sealed, for example, between the side edge seals and the mid-pack seals, to form wing seals.

The inner package may also be coupled to the outer package of the pack 10. For example, the top edge and the bottom edge of the at least one inner package may be sealed between the first sheet and the second sheet with the top transverse seal and the bottom transverse seal. The inner package is thereby coupled to the outer package. Other suitable means for coupling the inner package with the outer package, including adhesives, fasteners, and the like, may also be employed.

The pack 10 of the present disclosure may also be perforated to facilitate both a separation of the packs 10, and an opening of individual packs 10. For example, the perforation may extend inwardly from the top edge of the pack 10. The perforation may traverse at least one of the top edge seal, the top transverse seal, and the bottom transverse seal, in order that the seals may be opened. Access to the inner package is thereby permitted.

A method and system for manufacturing a cost-effective pack for supplies that may be easily air dropped and distributed to a large number of people, with a minimized risk of damage to the supplies and to the people collecting the supplies, is thereby provided.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising" includes the terms "consisting of" and "consisting essentially of," and the terms comprising, including, and containing are not intended to be limiting.

The invention claimed is:

1. An aerial distribution system for deploying items, comprising:
   a support structure;
   a bulk shipping container coupled to the support structure such that the support structure is the bottom surface of the bulk shipping container and does not separate during deployment;
   a plurality of deployment boxes within the bulk shipping container, each deployment box containing at least one item; and
   a freefall retarding device coupled to the bulk shipping container;
   wherein the support structure and the bulk shipping container are comprised of corrugated plastic; and
   wherein, during deployment, each of the plurality of deployment boxes is adapted to exit the bulk shipping container and expel the at least one item within each of the deployment boxes.

2. The aerial distribution system of claim 1, wherein the freefall retarding device is a canopy or a parachute.

3. The aerial distribution system of claim 1, wherein the support structure is a pallet comprised of a corrugated plastic top and bottom and foam supports and the bulk shipping container has holes to allow a forklift to penetrate both the bulk shipping container and the pallet in unison.

4. The aerial distribution system of claim 3, wherein the plastic bottom is comprised of two sheets of superimposed corrugated plastic arranged orthogonally.

5. The aerial distribution system of claim 3, wherein the plastic bottom is proud of the plastic top and foam supports to create a skid board.

6. The aerial distribution system of claim 1, wherein each deployment box is coupled to a freefall retarding device.

7. The aerial distribution system of claim 1, wherein the bulk shipping container and the support structure are coupled via folding at least a portion of material comprising the bulk shipping container into the support structure.

8. The aerial distribution system of claim 1, wherein, prior to deployment, the freefall retarding device is coupled to a bottom portion of the bulk shipping container.

9. The aerial distribution system of claim 1, wherein each deployment box contains a plurality of aerodynamic supply packs.

\* \* \* \* \*